(12) United States Patent
Tang et al.

(10) Patent No.: US 11,569,863 B2
(45) Date of Patent: Jan. 31, 2023

(54) ACOUSTIC SENSING NODES AND RELATED SYSTEMS AND METHODS

(71) Applicant: CASE WESTERN RESERVE UNIVERSITY, Cleveland, OH (US)

(72) Inventors: Xinyao Tang, Cleveland Heights, OH (US); Soumyajit Mandal, Cleveland, OH (US); Joel B. Harley, Ann Arbor, MI (US); Tayfun Ozdemir, Ann Arbor, MI (US)

(73) Assignees: CASE WESTERN RESERVE UNIVERSITY, Cleveland, OH (US); VIRTUAL EM INC., Ann Arbor, MI (US)

( * ) Notice: Subject to any disclaimer, the term of this patent is extended or adjusted under 35 U.S.C. 154(b) by 198 days.

(21) Appl. No.: 17/032,693

(22) Filed: Sep. 25, 2020

(65) Prior Publication Data

US 2021/0099196 A1 Apr. 1, 2021

Related U.S. Application Data

(60) Provisional application No. 62/907,162, filed on Sep. 27, 2019.

(51) Int. Cl.
*H04B 1/40* (2015.01)
*G01M 5/00* (2006.01)

(52) U.S. Cl.
CPC ............. *H04B 1/40* (2013.01); *G01M 5/0066* (2013.01)

(58) Field of Classification Search
CPC ...... H04B 1/40; G01M 5/0066; G01M 5/0033
See application file for complete search history.

(56) References Cited

U.S. PATENT DOCUMENTS

| 11,169,288 B1* | 11/2021 | Johnson | G01V 1/306 |
| 2017/0367578 A1* | 12/2017 | Melodia | H04W 84/18 |
| 2019/0112918 A1* | 4/2019 | Yi | G01V 1/44 |

OTHER PUBLICATIONS

Thomas Hosman, et al.; "Design and Characterization of an MFSK-Based Transmitter/Receiver for Ultrasonic Communication Through Metallic Structures"; IEEE Transactions on Instrumentation and Measurement, vol. 60, No. 12, Dec. 2011; 8 pgs.
Jonathan D. Ashdown, et al.; "A Full-Duplex Ultrasonic through-Wall Communication and Power Delivery System"; IEEE Transactions on Ultrasonics, Ferroelectrics, and Frequency Control, vol. 60, No. Mar. 2013; 9 pgs.

(Continued)

*Primary Examiner* — Sung S Ahn
(74) *Attorney, Agent, or Firm* — Tarolli, Sundheim, Covell & Tummino LLP

(57) ABSTRACT

In an example, a system includes a plurality of acoustically coupled nodes. Each of the nodes includes a transducer, a communication circuit and a controller. The transducer is adapted to be mechanically coupled to a medium. The communication circuit is coupled to the transducer to send and receive acoustic signals via the medium according to at least one communication parameter. The controller is to adaptively configure the at least one communication parameter of the communication circuit based on an acoustic signal received from at least one other of the nodes.

23 Claims, 17 Drawing Sheets

(56) References Cited

OTHER PUBLICATIONS

Jinjiang Wang, et al.; "On Ultrasonic Communication Through Metal Structure for Machine Embedded Sensing"; Science Direct, Measurement 94—Journal homepage: www.elsevier.com/locate/measurement; Sep. 9, 2016, 10 pgs.

Pei Cao, et al.; "A Multi-Objective DIRECT Algorithm Toward Structural Damage Identification with Limited Dynamic Response Information"; Journal of Nondestructive Evaluation, Diagnostics and Prognostics of Engineering Systems; Copyright 2018 by ASME, downloaded from http://asme.digitalcollection.asme.org/nondestructive/article-pdf/1/2/021004/6406620/nde_001_02_021004.pdf bu Case Western University user on Nov. 12, 2020; May 2018, vol. 1; 12 pgs.

Seth S. Kessler,; "Hybrid Passive/Active Impact Detection & Localization for Aerospace Structures"; metis design; http://www.metisdesign.com; 2013; 20 pgs.

Xinyao Tang, et al.; "A Highly-Integrated CMOS Transceiver for Active Structural Health Monitoring"; IEEE downloaded on Nov. 12, 2020 at 5:45:01 UTC from IEEE Xplore; 6 pgs.

Theodosia Stratoudaki, et al.; "Full Matrix Capture and the Total Focusing Imaging Algorithm using Laser Induced Ultrasonic Phased Arrays"; AIP ConTerence Proceedings 1806, 1806, 020022 (2017); https://doi.org/10.1063/1.4974563, Published Online: Feb. 16, 2017; 10 pgs.

Yoonmyung Lee, et al.; "Ultralow Power Circuit Design for Wireless Sensor Nodes for Structural Health Monitoring"; Proceedings of the IEEE; vol. 104, No. 8, Aug. 2016; 18 pgs.

Jayant Charthad;, et al.; "A mm-Sized Wireless Implantable Device for Electrical Stimulation of Peripheral Nerves"; IEEE Transactions on Biomedical Circuits and Systems, vol. 12, No. 2, Apr. 2018; 14 pgs.

Xinyao Tang; "Multivariate Remote Process Sensing for Online Quality Control of Injection Molding"; UCONN Library, University of Connecticut Open Commons@UConn; Master's Theses 710; https://opencommons.uconn.edu/gs_theses/710; Dec. 16, 2014; 96 pgs.

Robert X. Gao, et al.; Online Product Quality Monitoring through In-Process Measurement; Science Direct—CIRP Annals—Manurfacturing Technology—journal homepage vol. 63, Issue 1, 2014, http://ees.elsevier.com/cirp/default.asp; https://doi.org/10.1016/j.cirp.2014.03.041; 4 pgs.

Ajay Raghavan, et al.; "Review of Guided-wave Structural Health Monitoring"; The Shock and Vibration Digest; http://svd.sagepub.com; Apr. 17, 2008; 25 pgs.

Kevin Wanuga, et al.; "High-Data-Rate Ultrasonic Through-Metal Communication"; Letters—IEEE Transactions on Ultrasonics, Ferroelectrics, and Frequency Control, vol. 59, No. 9, Sep. 2012; 3 pgs.

Mira Mitra, et al.; "Guided Wave Based Structural Health Monitoring: A Review"; Topical Review, IOP Publishing Smart Materials and Structures—Smart Mater. Struct 25 (2016) 053001—doi:10.1088/0964-1726/25/5053001; Mar. 30, 2016; 28 pgs.

Dongjin Seo, et al.; "Wireless Recording in the Peripheral Nervous System with Ultrasonic Neural Dust"; NeuroResource Neuron; http://dx.doi.org/10.1016/j.neuron.2016.06.034; Aug. 3, 2016; 12 pgs.

Hossein Zamani, et al.; "A Current-Controlled Transceiver IC for Structural Health Monitoring"; Downloaded on Nov. 12, 2020 UTC from IEEE Xplore; 4 pgs.

* cited by examiner

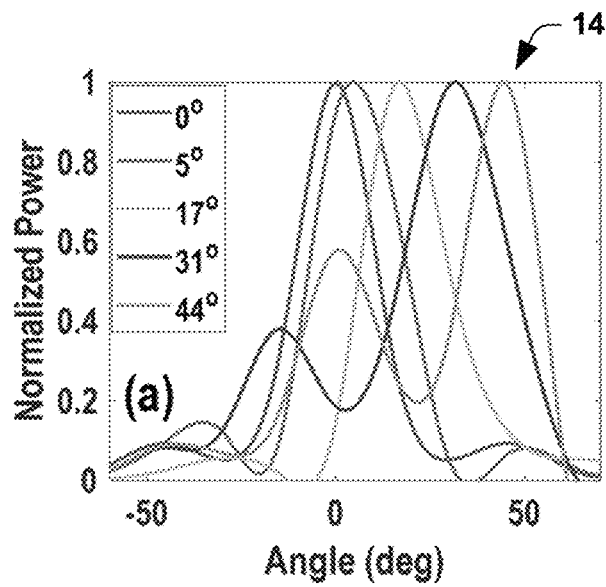
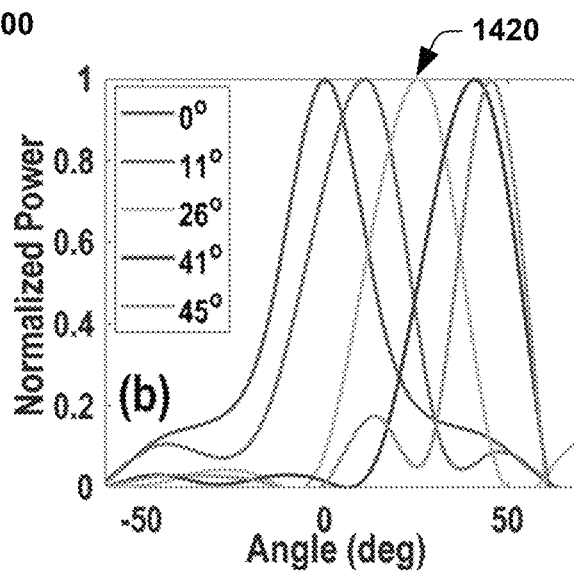
FIG. 14A  FIG. 14B
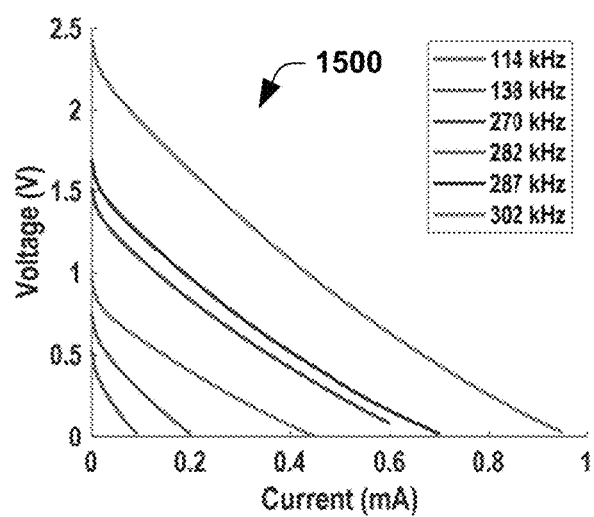
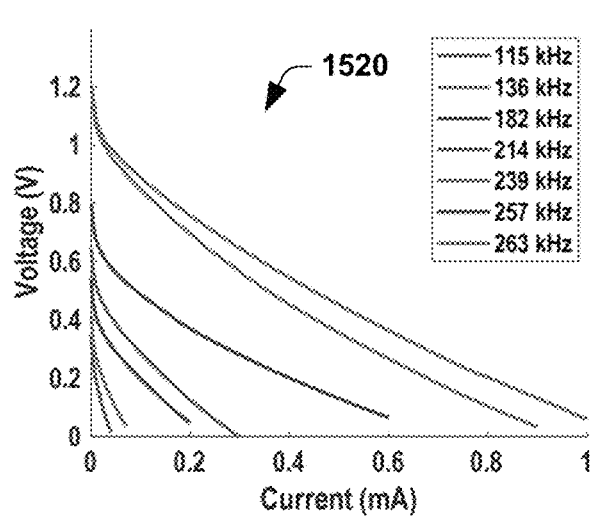
FIG. 15A  FIG. 15B

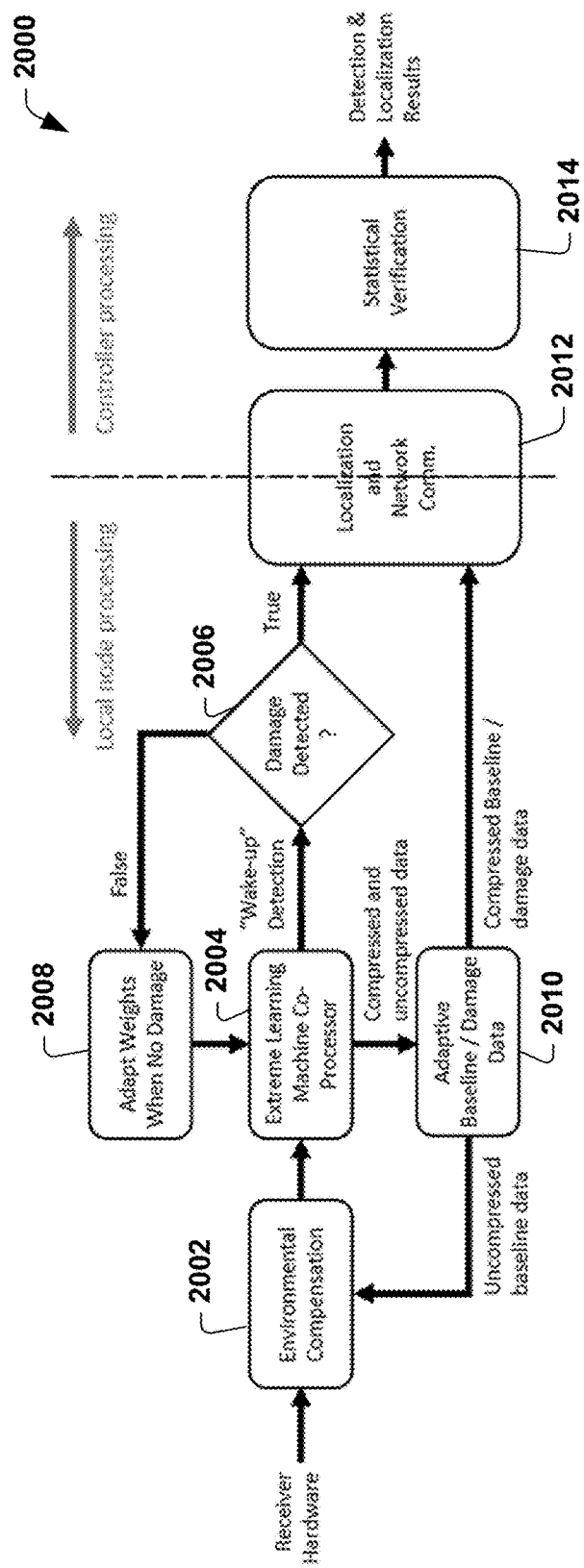
FIG. 20
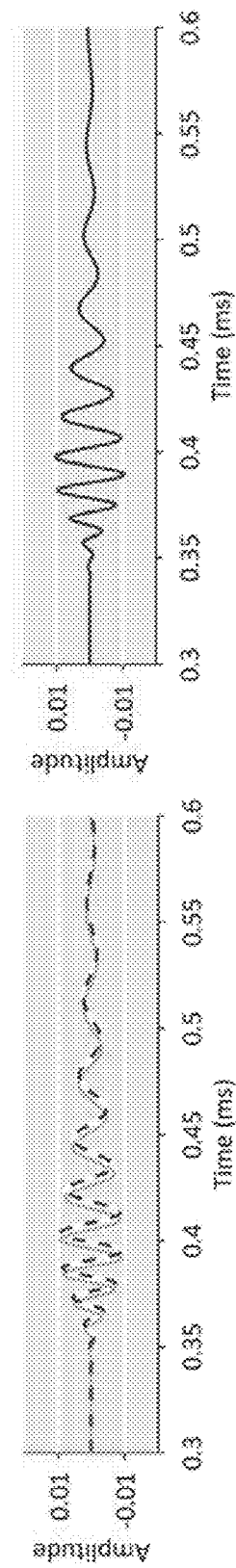
FIG. 21A
FIG. 21B

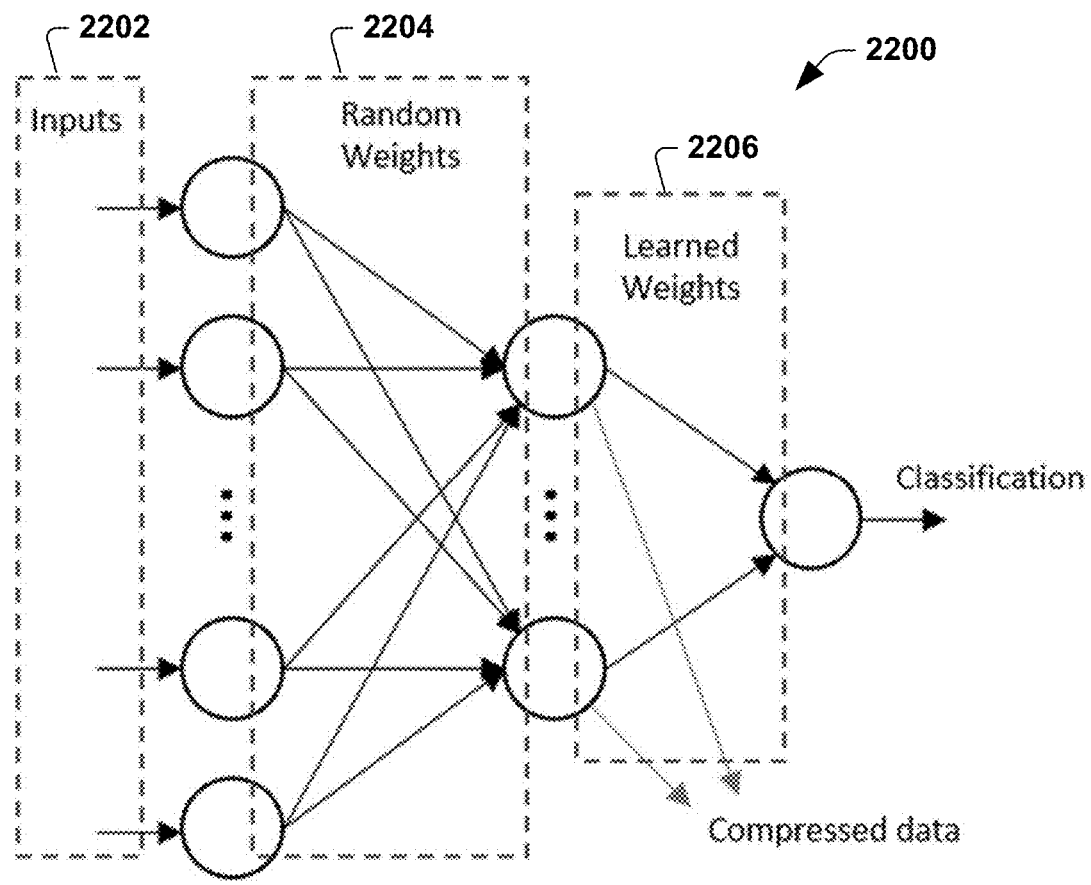
FIG. 22
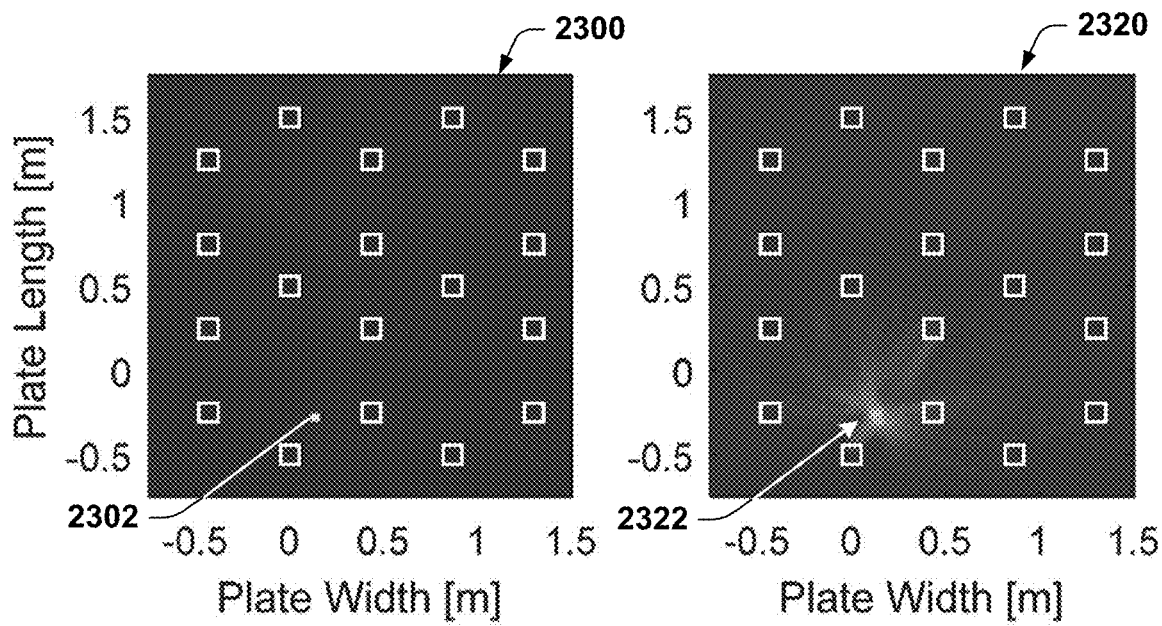
FIG. 23A  FIG. 23B

ACOUSTIC SENSING NODES AND RELATED SYSTEMS AND METHODS

CROSS-REFERENCE TO RELATED APPLICATION

This application claims the benefit of priority from U.S. Provisional patent application No. 62/907,162, filed Sep. 27, 2019, which is incorporated herein by reference in its entirety.

GOVERNMENT FUNDING

This invention was made with government support under Contract No. FA9550-17-C-001 awarded by the U.S. Department of Defense (Air Force Office of Scientific Research). The United States government has certain rights to the invention.

TECHNICAL FIELD

This disclosure relates to acoustic sensing nodes and to related systems and methods, such as for implementing acoustically coupled sensor networks.

BACKGROUND

An acoustic network may be formed of a collection of two or more nodes that communicate using modulated signals carried by elastic body or surface waves. For example, acoustic networks have been implemented in water (e.g., oceans) where acoustic nodes are distributed throughout the body of water and communicate using acoustic signals that propagate through the water as body waves.

Ultrasonic guided waves have also been used for nondestructive testing (NDT), structural health monitoring (SHM), and other applications. Lamb waves are elastic guided waves that propagate on and through large areas of structures (e.g., thin plates or shells) with low attenuation and are thus the most widely used ultrasonic guided waves for NDT and active SHM, e.g., for testing pipelines, rails, ship hulls, and aircraft. Data transmission between such nodes is also important in enabling information sharing and sensor networking for SHM and other applications. Wires provide robust connections but face the challenge of exponentially-increasing routing/weight/size when scaling to very large networks. By contrast, wireless networking can eliminate wired interfaces and bulky batteries, thus maintaining flexibility and scalability of large sensor sheets. Wireless communications based on radio frequency (RF) or infrared (IR) are not applicable to embedded sensors in complex structures, particularly if they are electrically conductive and/or optically opaque.

SUMMARY

This disclosure relates to acoustic sensing nodes and to related systems and methods, such as for implementing acoustically coupled wireless sensor networks.

In an example, a system includes a plurality of acoustically coupled nodes. Each of the nodes includes a transducer, a communication circuit, and a controller. The transducer is adapted to be coupled to a medium. The communication circuit is coupled to the transducer to send and receive acoustic signals via the medium according to at least one communication parameter. The controller is to adaptively configure the parameter(s) of the communication circuit based on an acoustic signal received from at least one other of the nodes. For example, this parameter adjustment is used to improve the quality of the wireless transmission of power and/or data between the nodes by using acoustic signals.

In another example, a wireless sensing system includes a plurality of acoustically coupled wireless sensor nodes. Each of the nodes includes a piezoelectric transducer, a communication circuit and a controller. The piezoelectric transducer is adapted to be coupled to a medium. The communication circuit is coupled to the transducer to send and receive acoustic signals via the medium according to at least one communication parameter. The controller is to adaptively configure the at least one communication parameter of the communication circuit based on acoustic signals received from at least one other of the nodes. A control node is adapted to be coupled directly to a source of electrical power. Nodes in at least a set of the sensor nodes in the network are configured to communicate directly acoustically with the control node through the medium.

In yet another example, a method includes receiving, at a given wireless sensor node, at least one acoustic signal transmitted by at least one other wireless sensor node via a medium. Each of the wireless sensor nodes is disposed on or in the medium and acoustically coupled via the medium to form a wireless sensor network. The method also includes converting, at the given wireless sensor node, the at least one received acoustic signal to a corresponding received electrical signal. The method also includes analyzing the corresponding received electrical signal by a controller of the given wireless sensor node. The method also includes adaptively configuring at least one communication parameter of a communication circuit of the given wireless sensor node based on the analyzing of the received electrical signal such that the communication circuit of the given wireless node at least one transmits or receives acoustic signal according to the at least one communication parameter.

BRIEF DESCRIPTION OF THE DRAWINGS

FIGS. 14A and 14B depict examples of normalized power versus angle for a measured beam pattern.

FIGS. 15A and 15B depict a plot of voltage versus current depicting an example of measured power characteristics at different distances in a continuous wave mode.

FIG. 20 depicts an example of a workflow that may be utilized for processing signals in a wireless sensor network.

FIGS. 21A and 21B depict examples of simulated wave signals showing the effects of temperature on the respective signals.

FIG. 22 depicts an example of an extreme learning machine neural network that may be utilized for monitoring applications.

FIGS. 23A and 23B depict examples of plate with an arrangement of distributed acoustic sensor nodes that may be used for localizing damage on the plate.

DETAILED DESCRIPTION

Figure 1:
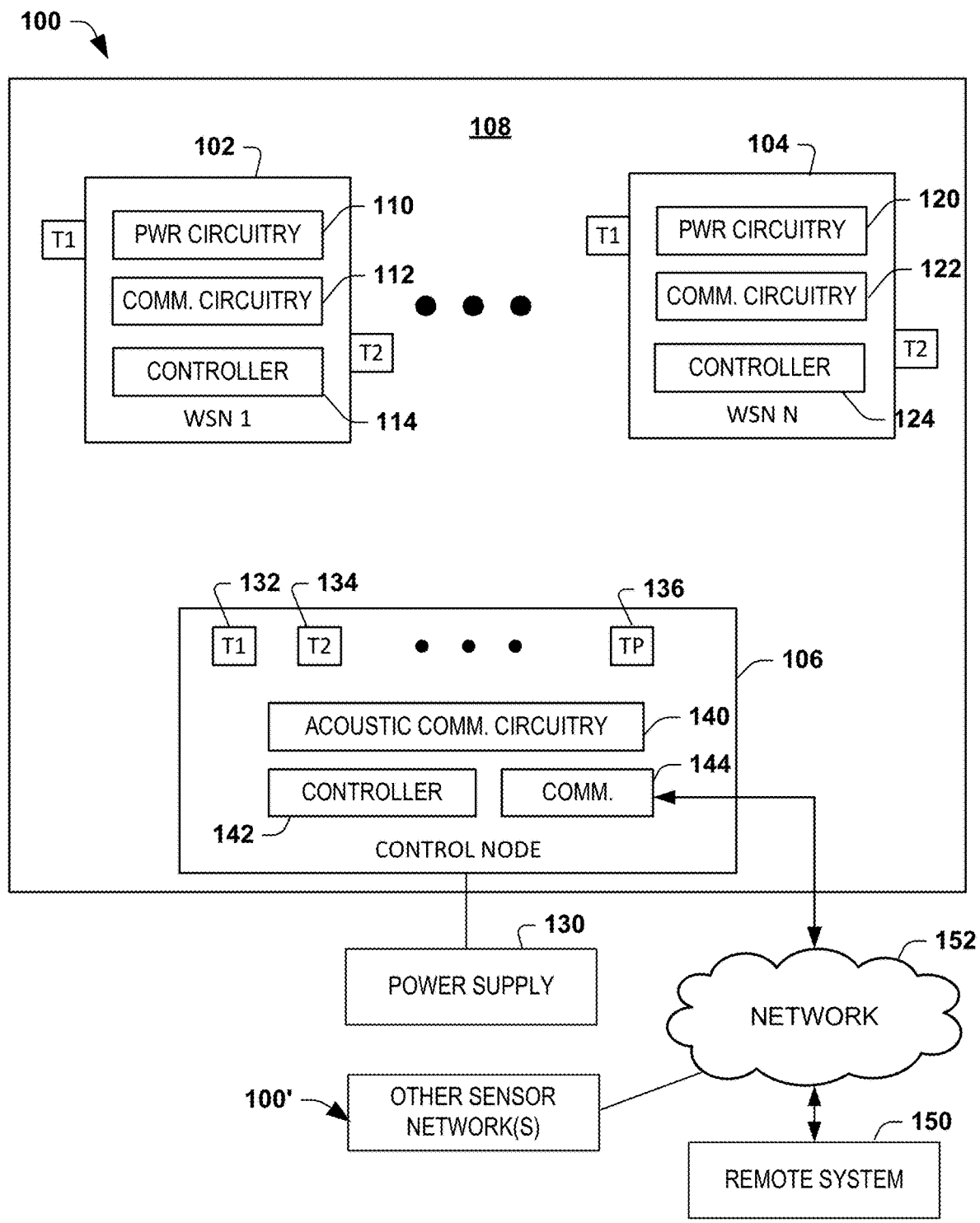
FIG. 1 depicts an example of a system for implementing a wireless sensor network.

This disclosure relates to acoustic sensing nodes and to related systems and methods, such as for implementing acoustically coupled wireless sensor networks. In an example, a system includes a plurality of acoustically coupled nodes adapted to communicate wirelessly using acoustic waves (e.g., surface and/or bulk wave modes) that propagate a medium to which the nodes are coupled to or embedded in. For sake of simplicity and ease of explanation, much of the following disclosure describes the medium as a solid material to which multiple sensor nodes are attached for performing structural health monitoring (SHM), such as to detect the existence location and/or severity of potential damage. However, in other examples, the sensor nodes may be attached to or embedded in one or more other forms of media to form a sensor network of acoustically coupled nodes.

For example, the medium may be a solid structure (e.g., a metal or plastic plate, animal bone or the like), a fluid (e.g., water, petrochemicals, or the like) or may include multiple media, such as a combination of one or more solid and/or fluid structures (e.g., muscle or other tissue). The nodes may include an arrangement of wireless sensor nodes (also referred to as WSNs) embedded in or attached any such media through which acoustic waves propagate.

As a further example, each of the wireless sensor nodes may include one or more transducers, such as a piezoelectric transducer, which may be attached to or embedded in the medium. Thus, the piezoelectric transducer is coupled to (e.g., in direct or indirect physical mechanical contact with) the medium to enable acoustic signals to be received and transmitted via the medium. The node also includes communication circuitry that includes a transmitter and a receiver (e.g., a transceiver). The communication circuitry may include various other components (e.g., one or more amplifiers, filters, waveform generators, analog to digital converters, drivers and the like) for sending and receiving acoustic signals via the medium. The communication circuitry is configured to send acoustic signals via the medium according to one or more programmable communication parameters. For example, the node includes a controller to adaptively configure one or more transmit parameter of the transmitter based on acoustic signals received (e.g., by the receiver) from at least one other of the nodes in the network. The controller may also configure one or more receiver parameters to control processing of received signals.

Each of the wireless sensor nodes, which are distributed across or throughout the medium to form the sensor network, is configured to make sensor measurements based on acoustic signals received from other nodes. The sensor network also includes a control node to which each wireless sensor node may send data (encoded in acoustic signals) based on sensor measurements. The wireless sensor nodes further may be configured to operate as relays within the sensor network for routing data and/or power transfer to other nodes (e.g., mesh networking).

The control node is configured similarly to the wireless sensor nodes, but may be connected to a source of electrical power. The control node also includes an arrangement of transducers to transfer power and data to the local nodes. In some examples, the control node may also control the measurement sequence at the wireless sensor nodes, such as by sending command data over an acoustic link to some or all the wireless sensor nodes. The control node also is configured to aggregate the acquired measurement data received in acoustic signals from the wireless sensor nodes, which may be stored in local memory and/or be or uploaded (e.g., through a network) to the cloud or other remote system.

As disclosed herein, the wireless sensor nodes are self-powered (e.g., wirelessly powered) in response to acoustic signals, including acoustic excitation signals transmitted by the control node. Due to the additional power requirements of the control node, which may include providing wireless power to a plurality of transducers (e.g., an array of transducers), the control node may be coupled to an external source of electrical power. At least some of the wireless sensor nodes are configured to communicate with the control node, which can include transmitting information encoded in acoustic signals sent over a data uplink as well as receiving data and power in acoustic signals over a respective uplink. The control node further may implement adaptive beamforming techniques to enhance power transfer efficiency and telemetry targeting accuracy.

Various types of modulation may be used for communicating data and power via the medium. Depending on the type of medium and the type of waveform, the acoustic signals may propagate on or through the medium. As disclosed herein, various communication parameters may be adaptively adjusted (e.g., by the controller) at each of the nodes, such as may include transmitter parameters (e.g., including frequency, data rate, modulation protocol, transmit power level, etc.) and receiver parameters (e.g., frequency response, amplifier gain, etc.).

The controllers or other components of each node further may be programmed to perform various detection and localization algorithms, which may vary depending on the particular application and environment where the wireless sensor network is implemented. Data received at the control node from wireless sensor nodes may be aggregated for further analysis and reporting according to application requirements. The wireless sensor network thus provides a cost effective and reliable solution for a variety of monitoring applications including structural health monitoring of physical structures (e.g., mechanical, civil and aerospace structures) as well as monitoring of living subjects (e.g., for monitoring or measuring conditions of biological tissue and/or implanted devices).

FIG. 1 depicts an example of a system 100 for implementing an acoustically coupled network of nodes 102, 104 and 106 (e.g., an intranet). The nodes 102, 104 and 106 are acoustically coupled for communication via a medium 108 to which the nodes are attached or embedded within. The type of medium 108 may vary depending on the application, such as mentioned above. The nodes 102, 104 and 106 may include one or more sensors and be configured for monitoring a condition of the medium 108, such as to detect the existence, location, and/or severity of potential damage to such media.

In the example of FIG. 1, the system 100 includes wireless sensor nodes (WSNs) 102, 104, demonstrated as WSN 1 through WSN N, where N is positive integer denoting the number of sensor nodes. The other node 106 is referred to herein as a control node and is configured to transmit power and data to the WSNs (or at least to a portion thereof) and to receive data from the WSNs. The number and arrangement of nodes generally depends on the type of medium 108 and the size of the area to be monitored.

For example, the WSN 102 includes one or more transducers, indicated at T1 and T2, as well as circuitry that includes power circuitry 110, communication circuitry 112 and a controller 114. The power circuitry 110 may include a power management circuit (PMU) configured to control power level for the WSN 102 as well as a power converter adapted to harvest electrical energy from the transducer T1. For example, the power converter is configured to convert a voltage from the transducer (e.g., a piezoelectric transducer) and boost it to a desired voltage level with high efficiency and to provide the boosted voltage to an energy storage device (e.g., a supercapcitor).

In an example, the power circuitry 110 and a data transceiver of the communication circuitry 112 are coupled to and share the same transducer T1, such as based on a time- or frequency-multiplexing protocol. Such sharing of the transducer helps to minimize the volume of the WSN. Another transceiver of the communication circuitry 112 may be coupled to utilize the other transducer T2, such as for performing internode communications with other WSNs. The energy harvester of the power circuitry 110 and transceivers of the communication circuitry operate on different frequencies because low-frequency narrowband operation is preferred for energy harvesting, and high-frequency broadband operation is preferred for data communications The controller 114 is programmed to adaptively configure one or more parameters of the communication circuitry 118 based on acoustic signals received from one or more other of the nodes 104, 106. For example, a receiver of the communication circuitry 112 receives an acoustic signal via the transducer T2 transmitted by another node 104. The received signal is processed and analyzed, which may include the controller 114 analyzing a frequency response of the received signal. The controller can in turn configure one or more parameters of the communication circuitry based on the analysis of the frequency response. The parameters may include transmission parameters, such as frequency and shape of the transmitted waveform (e.g., as Lamb or another acoustic wave type), modulation protocol and power level (e.g., amplitude). Examples of different modulate protocols that may be configured adaptively by the controller include phase shift keying (e.g., binary phase shift keying, quadrature phase shift keying) frequency shift keying and the like. Additionally or alternatively, the parameters may include receiver parameters, such as gain and frequency response of the receiver. Such closed-loop adaptation of communication parameters improves sensing accuracy, saves power, and increases hardware lifetime.

In an example, the controller 114 may adapt the communication parameters on a global basis such that the same communication parameters are used for communication with each of the other nodes. In another example, the controller 114 may adapt the communication parameters on a node basis such that the separate communication parameters are determined and configured for communication with each of the other nodes. For example, each of the nodes in the subnetwork has a unique communication link to at least some of the other nodes in a given subnetwork of nodes. The given subnetwork may include a proper subset of the WSNs or all the WSNs, which may depend on the overall size of the network and whether nodes can adequately communicate acoustically with the other nodes. The controller 114 may be programmed to adaptively configure one or more communication parameters for each communication link to enhance communications with each of the other nodes in such subnetwork. In an example, the nodes may be arranged in point-to-point network or an ad hoc (e.g., mesh) network in which each of the nodes communicates with a set of neighboring nodes that defines the given subnetwork. The network topology can determine which nodes belong to each subnetwork in the system.

In the example of FIG. 1, each of the WSNs 102 and 104 are demonstrated as having a common configuration. Thus, the WSN 104 includes one or more transducers T1 and T2, power circuitry 120, communication circuitry 122 and a controller 124. As mentioned, there can be any number of WSNs in the system 100, each of which includes a controller to adaptively configure one or more parameters of its communication circuitry for communication with other nodes in the system 100.

The controller 114, 124 of each WSN is further programmed to extract features of the medium 108 based on received acoustic signals received from other sensor nodes. The controller 114, 124 of each WSN is also programmed to determine classification results for classifying the extracted features associated with a portion of the medium through which the received acoustic signals propagate.

In some examples, each of the wireless sensor nodes in the system may utilize machine-learning algorithms (e.g., implemented in a machine learning co-processor). For example, the controller 114, 124 of each node includes a machine learning co-processor (MLCP) (e.g., an extreme learning machine (ELM) co-processor) that is programmed (e.g., trained) to perform highly-optimized feature extraction and classification algorithm on the raw time-domain waveforms received from nearby sensors.

The feature extraction and classification algorithm provides classification results that may correspond to very high-level categories, such as "normal"/"abnormal" or "target present"/"target absent". The high-level classification results determined at one node 102, 104 may be communicated through the network of nodes to the control node 106. This may be performed to reduce the amount of data (e.g., by compacting the data into a compressed format) that has to travel through the network as compared to sending raw data. In some examples, the classification results are also used by the controller 114, 124 to adapt communication parameters that are used to monitor the medium 108. Thus, as classification results may change over time, the controller can dynamically adjust the communication parameters (e.g., for one or more communication links) used for communicating with other nodes in the system 100. Additionally, the WSNs 102, 104 may be configured to transmit the classification results and other data to the control node 106 at a lower data rate than acoustic data and measurement signals transmitted to other WSNs.

In some examples, responsive to classifying a spatial region of the medium as containing an abnormality (or other unexpected condition), the controllers 114, 124 of multiple (e.g., at least three) of the WSNs are each configured to activate a localization function. The localization function is programmed to utilize communication of acoustic signals between the set of respective nodes in the set of WSNs (e.g., a subnetwork) to determine localization information describing a location of the abnormality (or other unexpected condition) with respect to the medium 108. For example, the controllers may implement a diffusion-based algorithm to determine localization information. The determined localization information may then be communicated from the WSNs through the network to the control node 106. In some examples, the localization information may be transmitted acoustically through the network in a compressed data format. Because diffusion is a purely event-driven process, a node only transmits information if it has detected an event or has received such information from another node for routing to the control node 106.

The control node 106 is adapted to be coupled to an external source of electrical power (e.g., a source of AC or DC power) 130. As mentioned, at least a set of the sensor nodes WSNs (e.g., neighboring nodes in a subnetwork with the control node) are configured to communicate directly with the control node. Other nodes may communicate indirectly by sending and receiving acoustic signal through the network of nodes, which may be routed through the network of nodes according to the network topology (e.g., multi-hop network or a point-to-point network) being implemented.

The control node 106 includes a plurality of transducers 132, 134 and 136, demonstrated as T1, T2 through TP, where P is a positive integer denoting the number of control node transducers. Each of the transducers 132, 134 and 136 is coupled to the medium 108 and is configured to send and/or receive acoustic signals (e.g., Lamb waves or bulk waves) via the medium 108. The transducers 132, 134 and 136 may be arranged in a linear array or another arrangement to facilitate communication with the WSNs 102 and 104. The transducers 132, 134 and 136 are configured to convert acoustic signals received via the medium 108 into corresponding electrical signals.

The control node 106 also includes acoustic communication circuitry 140 coupled to the transducers 132, 134 and 136. The communication circuitry 140 includes a transmitter (e.g., waveform generator, power amplifiers, etc.) configured to control the transducers 132, 134 and 136 to transmit acoustic signals into the medium 108. For example, the transducers 132, 134 and 136 are configured to convert electrical signals received from the transmitter into corresponding acoustic signals for transmission via the medium. The acoustic communication circuitry 140 also includes a receiver configured to receive electrical signals from the transducers 132, 134 and 136 (converted from acoustic signals received via the medium 108) and perform signal processing (e.g., amplification, filtering, demodulation) on received acoustic signals.

The control node 106 also includes a controller 142 configured to control operation of the node and its functions. Specifically, the controller 142 is configured to control the acoustic communication circuitry 140, such as to control transmit parameters for acoustic signals sent from the transducers 132, 134 and 136 to the medium. For example, the controller can control actuation of the transmitters according to transmit parameters, such as including power level, wavelength (frequency), data rate, and modulation protocol. In an example, the controller 142 controls the acoustic communication circuitry to implement adaptive beamforming to focus the acoustic signal through the medium 108 by controlling transmit time delays across the array of transducers 132, 134 and 136. The controller 142 may also utilize adaptive frequency selection, which may vary according to properties of the medium 108, to further increase power transfer across the medium for communicating (e.g., power and data) with the WSNs 102 and 104.

In one example, the control node 106 uses an acoustic channel to send configuration commands to instruct WSNs 102-104 to change their operating parameters (e.g., frequency, data rate, amplitude and waveform shape). The control node may also operate to provide trigger command signals to instruct the WSNs 102-104 to transmit monitoring pulses. The controller may thus implement fine-grained control over the spatio-temporal excitation pattern used by the WSNs 102-104. In other examples, the WSNs 102-104 may operate autonomously or collectively (without triggers from the control node 106) to transmit monitoring signals (e.g., acoustic pulses) or data signals (e.g., modulated acoustic signals carrying data) to other nodes, which such nodes may adaptively configure as described herein.

An asynchronous communication scheme based on frequency-shift keying (FSK) or orthogonal frequency-division multiplexing (OFDM) may be used for the data uplink in order to avoid the need for power-hungry clock recovery circuits within each node. In one example, the control node 106 assigns a unique frequency band to each WSN, such that frequency-division multiplexing can be used to address individual nodes. The controller may also transmit a multi-frequency continuous wave (CW) carrier for power transfer to the WSNs. The use of multiple acoustic frequencies helps to ensure efficient power transfer to most of the nodes. The spatial, temporal, and frequency distributions of the monitoring and data communications, and power signals may be coordinated to ensure high performance and minimal interference.

As a further example, the controller is programmed to aggregate data received from the WNSs 102 and 104, such as including a description of extracted features (e.g., classification results). To reduce computations, the controller is programmed to generate images (e.g., two or three-dimensional maps) of the medium based on the compressed data output from the WSNs 102 and 104 instead the much larger raw data. Using such compressed data can still accurately compute the metrics used by localization algorithms (e.g., Reconstruction Algorithm for Probabilistic Inspection of Damage [RAPID] or delay-and-sum [DAS]). To improve communication efficiency, data is locally preprocessed on each node 102 and 104 to minimize the data transmitted. For example, RAPID may be implemented to only transmit M−1 values (the correlation coefficients with the M−1 other sensors) per node. Additionally, DAS may be implemented to transmit only M−1 wavelet coefficients (i.e., compressed localization images) per node.

In a further example, the controller 142 is programmed to apply statistical verification to each image that is produced, which helps mitigates false positive results for the medium. For example, the controller is programmed to utilize extreme value statistical theory to determine if the maximum values in the images (as well as other values) represent are statistically significant rather than part of the noise. A similar statistical metric is achievable for RAPID since the correlation coefficient is closely related to statistical matched filters. Therefore, these statistical measures help ensure statistically significant (with a constant rate of false alarm) damage detection and localization. The aggregate data from the nodes 102, 104 is statistically significant (and not just noise), the controller can generate a spatial map for medium, which may include localized points or regions of interest, such as determined to contain an abnormality or damage.

The control node also includes one or more other communication interfaces 144, which may be used to connect the sensing system 100 to a remote system 150 through a network 152, such as an intranet or the Internet. For example, the communication interface 144 may implement a physical (e.g., Ethernet or optical fiber) or wireless (e.g., WiFi or cellular) form of communications to communicate through the network 152. In this way, the control node 106 may send information and that has been collected from the WSNs as well as processed information (e.g., one or more maps) that has been generated for the medium 108 to the remote system 150. In some examples, the control node 106 is one of a plurality of local control nodes and is connected to one or more other control nodes from other wireless sensor networks 100' and also a global control unit (not shown). For example, a plurality of sensor networks for monitoring the same or different structures may be coupled together through the network 152. In other examples, the network 152 may be implemented as a shared bus (such as controller area network (CAN)) for connecting multiple sensor networks.

By way of example, a plurality of the sensing systems 100 may be installed at different parts of a common structures (e.g., a vehicle, building, bridge etc.), and the remote system 152 can collect data from each of the parts to ascertain a global map for the overall structure. In other examples, the control nodes for each of the respective sensing systems can communicate with each other through the network 152. The remote system can also send reports or alerts to specified locations using one or more communication methods (e.g., email, text messages and the like). Additionally, at each control node 106 and/or the remote system 150, data may be collected and stored over an extended period of time (e.g., days, weeks, years), which may be analyzed to identify and predict potential issues.

The remote system 152 can include a server, a general purpose computing device (e.g., notebook computer, laptop, desktop computer, workstation, smartphone or the like) and/or it can be a special purpose system configured to interact with one or more of the control nodes 106 via the network. In another example, the remote system 152 may send program instructions to the control node to configure and/or update its operating program instructions, which may in turn be used to update and/or reprogram the WSNs 102 and 104.

Figure 2:
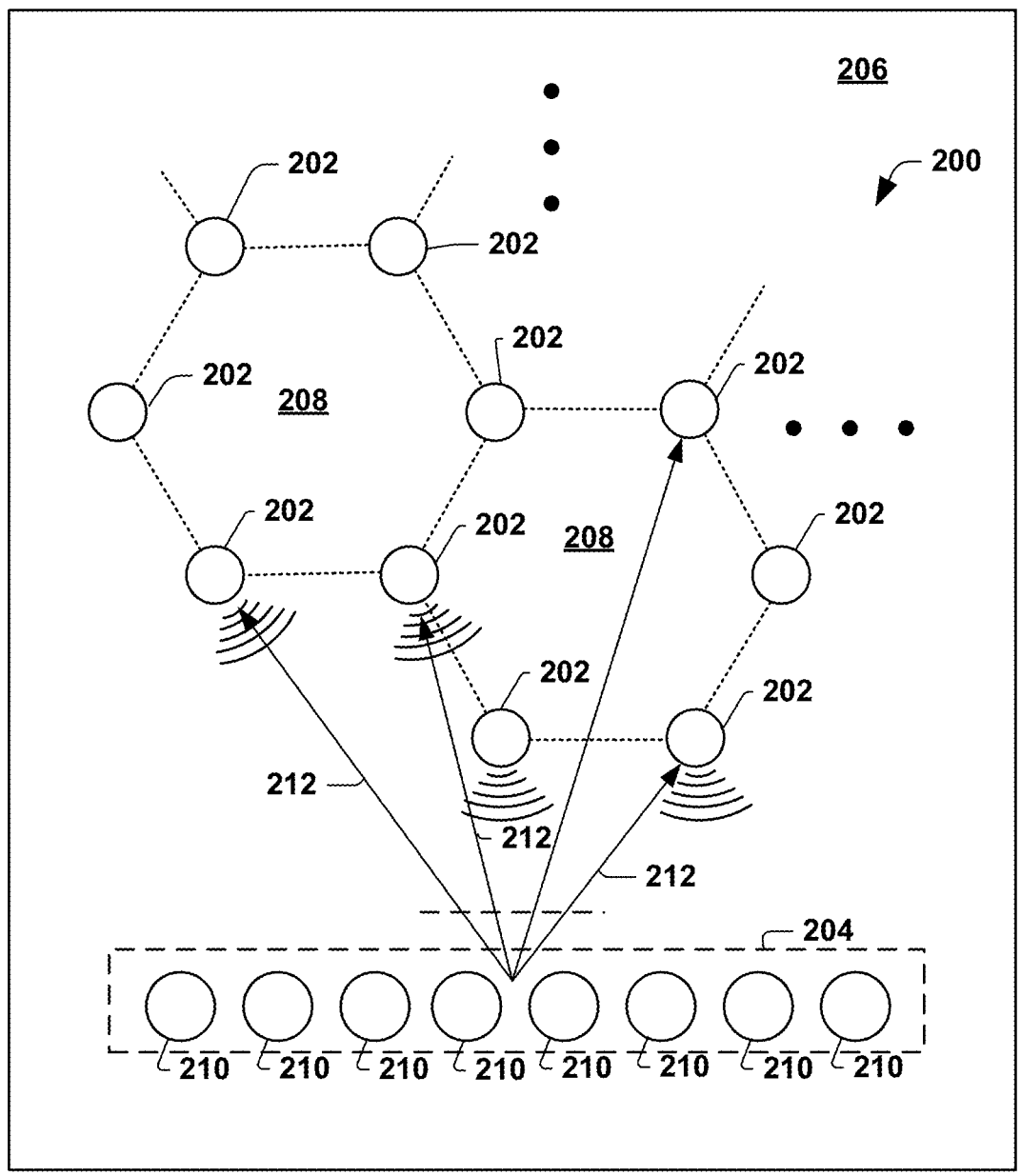
FIG. 2 depicts an example arrangement of nodes for implementing a wireless sensor network.

FIG. 2 depicts an example of a network architecture for a sensor system 200 that includes coupled WSNs 202 (e.g., nodes 102-104 of FIG. 1) and a control node 204 (e.g., node 106 of FIG. 1) distributed across (e.g., on or embedded within) a medium 206, such as may be used to implement the system 100 of FIG. 1. Accordingly, reference may be made back to FIG. 1 for additional information about each of the nodes 202, 204. FIG. 2 illustrates one an example of a distribution and arrangement of nodes 202, 204 across the medium 206.

In the example of FIG. 2, sets of WSNs 202 are grouped into logical subnetworks 208. The nodes 202 in each subnetwork 208 are configured to communicate with each other. As shown, some nodes may be part of more than one subnetwork such that these multi-network nodes can communicate among nodes belonging to multiple subnetworks. It is understood that the network is not limited to such network topology and may implement various network topologies, such as mesh or ad hoc networks, point to point networks to name a few. For instance, a mesh network enables communication with WSNs that are far from the local controller, thus enabling large regions of the medium 206 to be monitored. In some examples, the network topology may be a parameter that is configurable (e.g., by the control node 204).

As an example, some nodes 202 (e.g., as set or one or more neighboring nodes) further may be adapted to communicate data over a wireless acoustic uplink to the control node 204. The data communicated may originate with the node that directly communicates with the control node 204 or the data being communicated can originate with any other node and has been routed through the network according to the network topology. Similarly, those nodes in communication with the control node (or additional nodes) may receive acoustic signals (e.g., power and data signals) transmitted by the control node 204.

As a further example, FIG. 2 depicts the control node 204 as including a linear array (e.g., a uniform linear array) of a plurality of piezoelectric transducers 210 having a uniform spacing that is set as a mathematical function to the wavelength of the transmit signals to perform beam steering of acoustic signals in the medium 206, such as disclosed herein. For example, the array of piezoelectric transducers 210 can be controlled (e.g., by controller 142) for transmission and/or reception detected with individually-controlled time delays for beamforming (e.g., focusing acoustic energy in particular directions, demonstrated at 212, which can be electronically tuned by controlling time delays across the array). For instance, the control node 204 also includes a waveform generator and programmable time delay block to enable transmit beamforming with the WSNs, which may utilize a variety of beam profiles. Beamforming improves measurement SNR, which allows damage or other conditions to be detected and localized across the medium 206 with fewer nodes 202 and/or lower transmit voltage per node.

Figure 3:
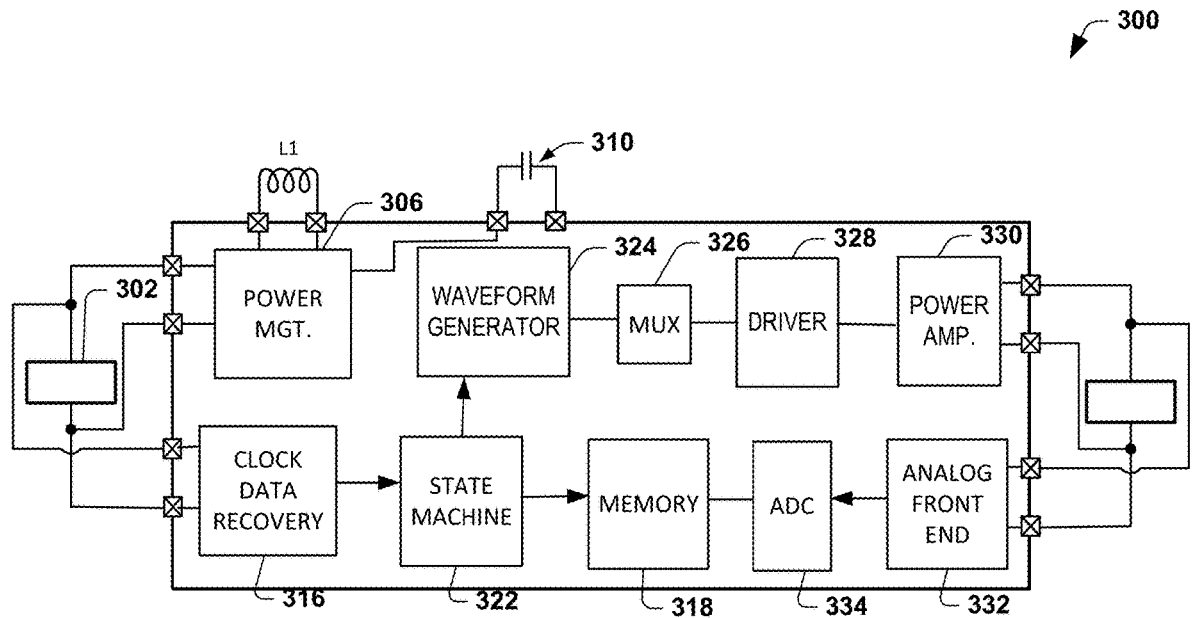
FIG. 3 is a block diagram depicting an example of a wireless sensor node.

FIG. 3 is a block diagram depicting an example of a WSN 300 (e.g., WSN 102, 104 or 202). In this example, the WSN 300 includes two piezoelectric transducers 302 and 304. A greater or lesser number of transducers may be used in other examples. The transducer 302 is coupled to a power management subsystem 306 and a clock and data recovery block 316 (e.g., corresponding to part of communication circuitry 112, 122 and control system 114 and 124). The power management subsystem 306 is configured to harvest energy from acoustic signals received at the transducer 302 and store such energy in an energy storage device 310, such as a supercapacitor. The power management subsystem 306 is also configured (e.g., including a power converter, such as a low drop out regulator) to supply electrical energy (e.g., a regulated DC voltage) at a predetermined voltage to the components of the WSN 300, such as through one or more power bus (not shown).

In an example, the transducer 302 is used for power delivery and data downlink from a control node (e.g., node 106), and thus may be coupled to receiver and signal processing circuitry. For example, the WSN 300 includes a data and clock recovery (CDR) block 316 and to receive corresponding power and data received from another node via the transducer 302. The CDR 316 is configured to demodulate the corresponding electrical signal provided by the transducer 302 and extract data and clock signals (for synchronization). The CDR 316 provides the recovered data and clock signal to a finite state machine (FSM) for additional processing and controls. For example, data may be stored in memory 318, which may be accessed by a controller or other components for additional processing. The controller may be implemented on the same integrated circuit (IC) chip as the circuitry shown in FIG. 3 (e.g., as a system-on-chip [SoC] device) or on a separate IC chip.

In an example, the stored data may be accessed to a controller (not shown) or other processing unit to implement controls based on the received data. In one example where the received power signal is determined (e.g., by the controller) to be relayed to one or more other nodes, the state machine 322 can activate a transmit path, which includes a pulse generator (e.g., oscillator) 324, multiplexer 326, driver 328, and power amplifier (PA) 330 for supplying an excitation signal to the transducer 304 to transmit an acoustic signal to one or more neighboring nodes in the network.

As a further example, the transducer 306 may be used for performing sensor measurements of the medium, which may include both transmitting and receiving acoustic signals. The transducer 306 may also be used for data uplink to the control node. The transmitter and receiver circuitry (e.g., transceiver) includes the driver 328 and power amplifier 330 for transmitting acoustic signals from the transducer 304 and an analog front end 332 for receiving acoustic signals from the transducer 304. For example, the analog front end may perform filtering, amplification, and demodulation of the received electrical signal from the transducer 304 and provide a corresponding received signal to an analog-to-digital converter (ADC) 334 (e.g., a successive-approximation ADC), which converts the signal to a corresponding digital representation thereof. The ADC may be coupled to the memory 318 and may store the digital signal in the memory for further processing (e.g., by a controller, such as a microcontroller [MCU]), as disclosed herein.

In some examples, the circuitry of the WSN shown in FIG. 3 is implemented as a system-on-chip (SoC), demonstrated at 312. The energy harvesting function of the power management subsystem 306 and transceivers operate on different frequencies (e.g., set by the state machine 322), such as disclosed herein.

The state machine 322 and/or controller further may be configured to control a sensing method that includes transmitting and receiving acoustic signals by the transducer 304, which may be used for calibrating the WSN 300 and/or measuring properties of a medium to which the WSN is attached to or embedded in. For example, the state machine 322 and/or controller is configured to control the transmitter 324, 326, 328 and 330 according to a set or more transmit parameters (e.g., waveform shape, amplitude, modulation protocol and frequency), which may be stored in the memory 318. The transmit parameters may be adaptively configured, such as disclosed herein. The state machine 322 further may control the receiver (e.g., gain and frequency response) according to receive parameters that are also adaptively configured and stored in memory 318.

The controller further may be configured to implement machine learning and advanced signal processing as disclosed herein. While in the example of FIG. 3 the monitoring measurements are performed by transmitting acoustic signals via one or more transducers, the node 300 may include one or more other sensors (e.g., temperature sensors, accelerometers, pressure sensors or the like) which can be combined with the acoustic measurement information to provide additional information about the medium and its environment.

Figure 4:
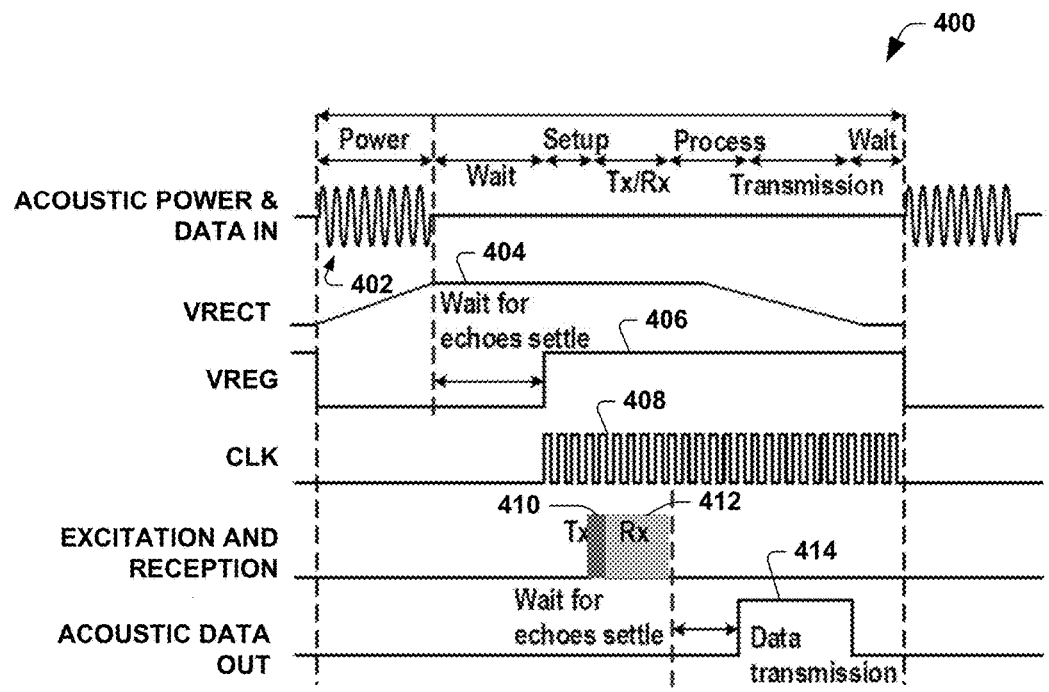
FIG. 4 is a signal diagram depicting an example of signals that may be communicated in a wireless sensor network.

FIG. 4 is a signal diagram 400 depicting an example of timing among signals that may be implemented in a WSN. For ease of explanation, the signal diagram 400 will be described in the context of the WSN 300; though, it is equally applicable to other WSNs (e.g., WSNs 102-104, 202, 500, 600) disclosed herein. In an example, the operation of the WSN may be controlled by a state machine (e.g., FSM 322).

As shown in the example of FIG. 4, a power phase includes the WSN 300 receiving at transducer 302 acoustic power and data, demonstrated at 402. The power management subsystem 306 rectifies the received (e.g., sinusoidal) signal to convert it to a DC signal, demonstrated at 404. After a waiting phase, which is to allow the echoes from the received power signal settle, the power management subsystem 306 also includes a voltage regulator (e.g., an LDO or charge pump) to produce a regulated voltage VREG. The duration of the waiting phase may be a fixed time value or be variable, such as based on monitoring the amplitude at the output of the transducer 302.

After the waiting phase ends, the WSN enters a setup phase in which a clock signal CLK is generated (e.g., by CDR 316), demonstrated at 408. The clock signal is provided to communication circuitry (e.g., transmitter path circuitry 324, 326, 328 and 330). The WSN 300 enters a transmit/receive phase in which the transmitter generates a monitoring pulse (demonstrated at 410) that is provided to excite the transducer 304 for generating an acoustic signal pulse in the medium. The TX/RX phase also includes a reception period following the transmission pulse in which acoustic signals received (demonstrated at 412) at the transducer 304 are passed to the receiver 332 through a transmit-receive switch (duplexer) for additional signal processing. The receive portion 412 of the TX/RX phase may be used to receive reflected signals (e.g., echoes) from the signal(s) transmitted by the WSN 300 during the transmit portion 410 and/or signals transmitted by one or more nearby WSNs. The WSN then enters a processing phase during which signal processing and analysis may be performed by a controller of the WSN, such as disclosed herein. During the processing phase, a delay is implemented to allow echoes to settle based on the excitation and reception of signals at 410 and 412. As described herein, WSNs may also be configured to implement passive sensor measurements or hybrid active-passive sensor measurements.

The WSN 300 then enters a transmission phase in which acoustic data is transmitted from the WSN, demonstrated at 414. For example, data is encoded, modulated and transmitted from the WSN as an acoustic data signal by a transducer 302, 304. For example, data being transmitted to one or more other WSNs may be sent with a first set of transmission parameters and data transmitted to the control node may be sent with a second, different set of transmission parameters. Additionally, data communicated may be compressed data, such as including classification results derived based on feature extraction and classification. After completing the transmission at 414, the WSN may enter a wait phase until a next power and data signal is received and the state/phase changes may be repeated, such as to perform another measurement.

Figure 5:
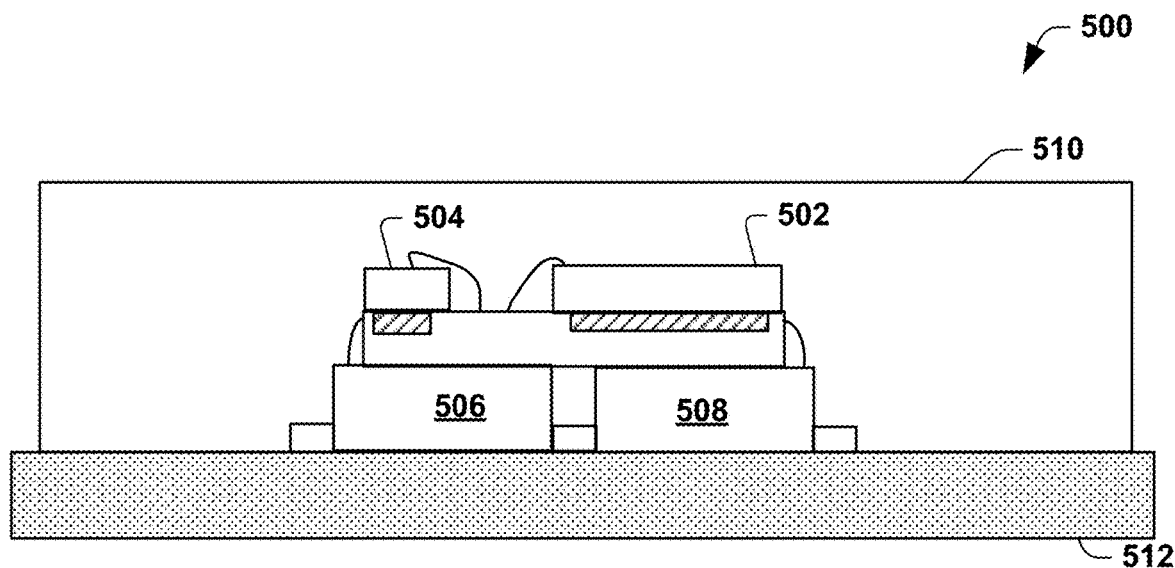
FIG. 5 is a side sectional view of an example wireless sensor node.

FIG. 5 depicts a side sectional view of example WSN 500. In this example, the WSN 500 includes an SoC (e.g., an application-specific IC [ASIC]) that includes an on-chip MLCP 502, a rechargeable energy storage device (e.g., a small supercapacitor) 504 and the piezoelectric transducers 506 and 508 used for performing measurements, data transfer, and power transfer. For example, an adhesive (e.g., epoxy or other encapsulation material) 510 is used to attach the SoC die 502 and energy storage device 504 to an upper surface of the transducers 506 and 508. In one example, the transducers 506 and 508 may be mounted directly (e.g., in direct physical contact) with a medium (e.g., a structure) 512 through which acoustic signal are to be propagated for monitoring functions. In another example, the transducers 506 and 508 may be mounted to layer of an acoustic interface (e.g., a polymer substrate), which may be attached to the medium. Electrical connections among the components may be implemented using aluminum or gold wirebonds, for example.

Figure 6:
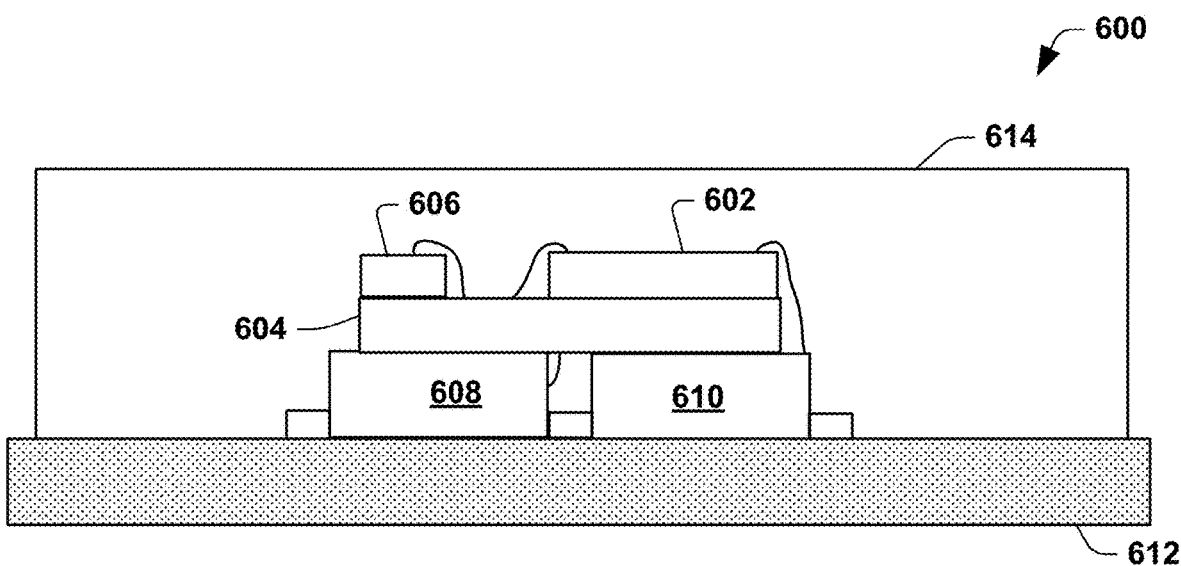
FIG. 6 is a side sectional view of another example wireless sensor node.

FIG. 6 is a side sectional view of another example WSN 600. In this example, the WSN 600 includes an SoC (e.g., an ASIC) 602, an off-chip MCU 604 that implements a machine learning co-processor, a rechargeable energy storage device (e.g., a small supercapacitor) 606 and the piezoelectric transducers 608 and 610 used for performing measurements, data transfer, and power transfer. The SoC 602 and energy storage device 606 may be mounted to an upper surface of the MCU 604 and the MCU may be mounted to upper surfaces of the transducers 608 and 610. The transducers 506 and 508 may be mounted directly (e.g., in direct physical contact) with a medium (e.g., a structure) 612 or mounted to layer of an acoustic interface (e.g., a polymer substrate) that may be attached to the medium. An epoxy or other encapsulation material 614 may hold the WSN components in place. Electrical connections among the components may be implemented using aluminum or gold wirebonds, for example.

Figure 7:
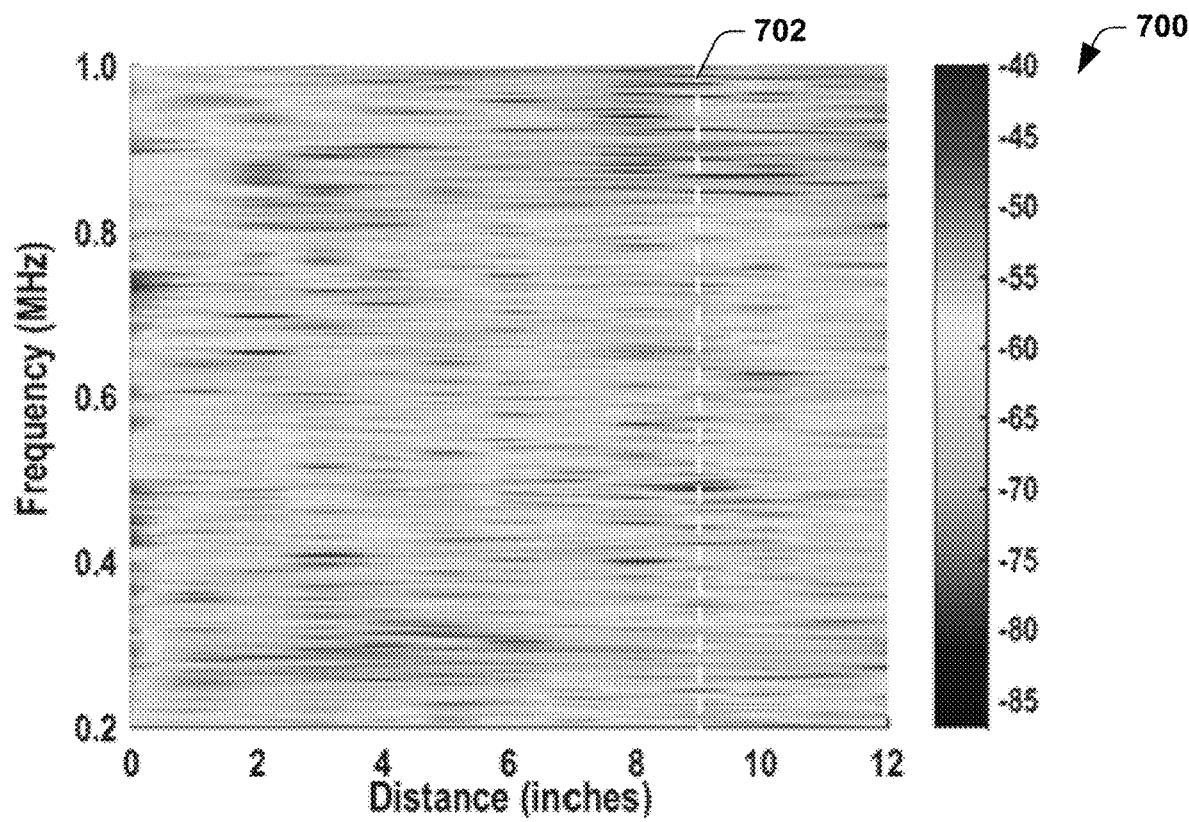
FIG. 7 is a plot of a measured sensor amplitudes at various transmission frequencies and distances.

FIG. 7 is a plot 700 of measured sensor amplitudes at various transmission frequencies and distances on a 3 mm thick steel plate. In the example of FIG. 7, the input waveform was a continuous sinusoid (e.g., 10 V-pp, swept from 200 kHz to 1.0 MHz) provided by a piezoelectric transducer (e.g., of a control node) mounted to the plate. The frequency plot 700 suggests that the presence of multipath reflections, multiple propagation modes, and temperature/strain fluctuations generally leads to complex variations of acoustic intensity versus frequency, distance, and time. Thus, as described herein, adaptive frequency selection based on distance can help maximize power transfer between nodes for internode communications. For example, as shown, when a WSN is located 9 inches away from the control node (dashed line on the plot), the optimal frequency for maximizing power transfer is approximately 500 kHz.

Figure 8:
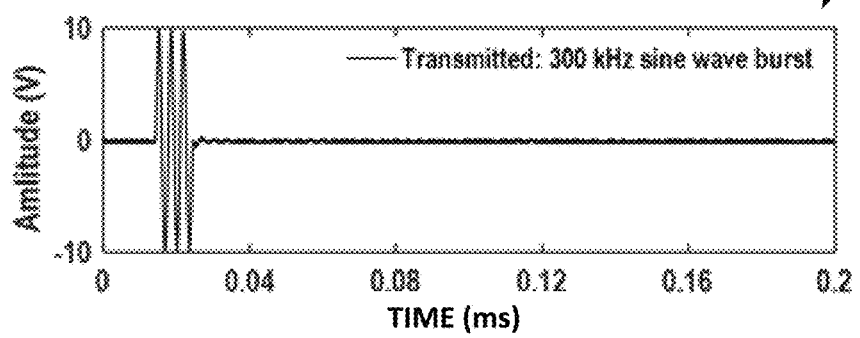
FIG. 8 depicts an example of a transmitted burst signal.

FIG. 8 depicts an example of a transmitted burst signal 800 on the same steel plate as in FIG. 7 for a short sine wave burst at a center frequency of 300 kHz.

Figure 9:
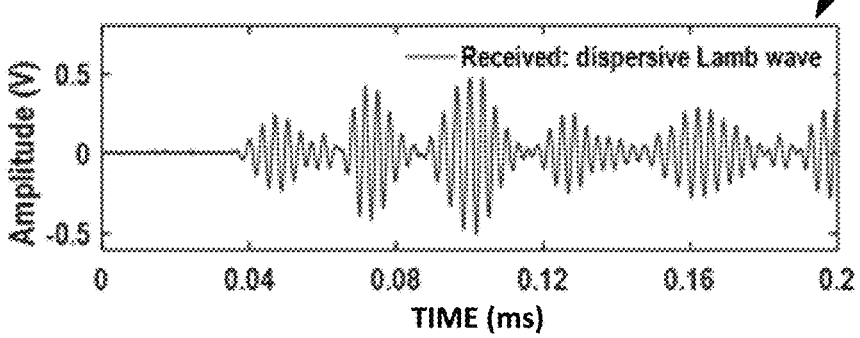
FIG. 9 depicts an example of a received signal responsive to the transmitted signal of FIG. 8.

FIG. 9 depicts an example of a received signal 900 responsive to the transmitted signal of FIG. 8 measured at a given length of about 9 inches.

Figure 10:
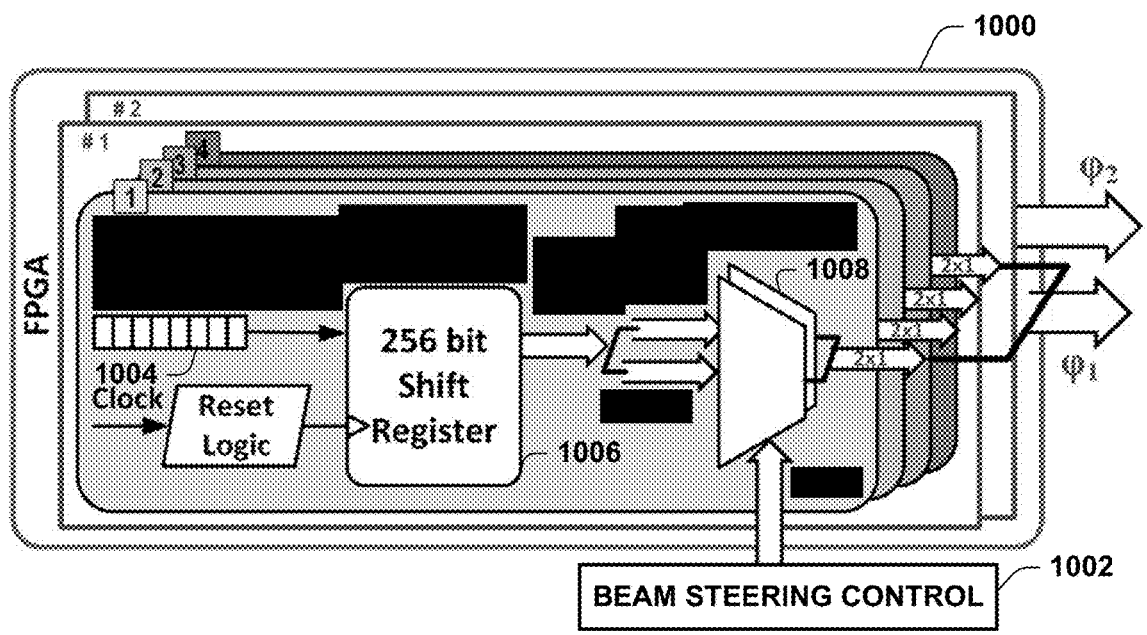
FIG. 10 depicts an example of a field programmable gate array configuration and steering control that may be implemented in a control node of a wireless sensor network.

FIG. 10 depicts an example of a field programmable gate array (FPGA) 1000 and beam steering control 1002 that may be implemented in a control node (e.g., node 106 or 204) of a wireless sensor network. The FPGA may be customized or an off-the-shelf model configured to implement computations and communication control, including pulse generation and beam steering control. In other examples, such functionality may be implemented by other hardware, such as microprocessors, programmable logic device or MCUs.

In the example of FIG. 10, the FPGA 1000 includes memory 1004 (e.g., read-only memory) programmed to store several predefined waveforms. The FPGA is configured to provide a selected waveform (e.g., determined by adaptive communication controls) to a shift register 1006, which (operating as a digital delay line) then provides the delayed waveform to a multiplexer 1008. Beam steering control 1002 provides instructions for adjusting the signal pulses being generated. For example, an apodization function (e.g., approximate Hamming window) is implemented through duty cycle control to perform pulse shaping based on the beam steering control 1002. The FPGA 1000 generates non-overlapping control signals $\phi 1$ and $\phi 2$.

Figure 11:
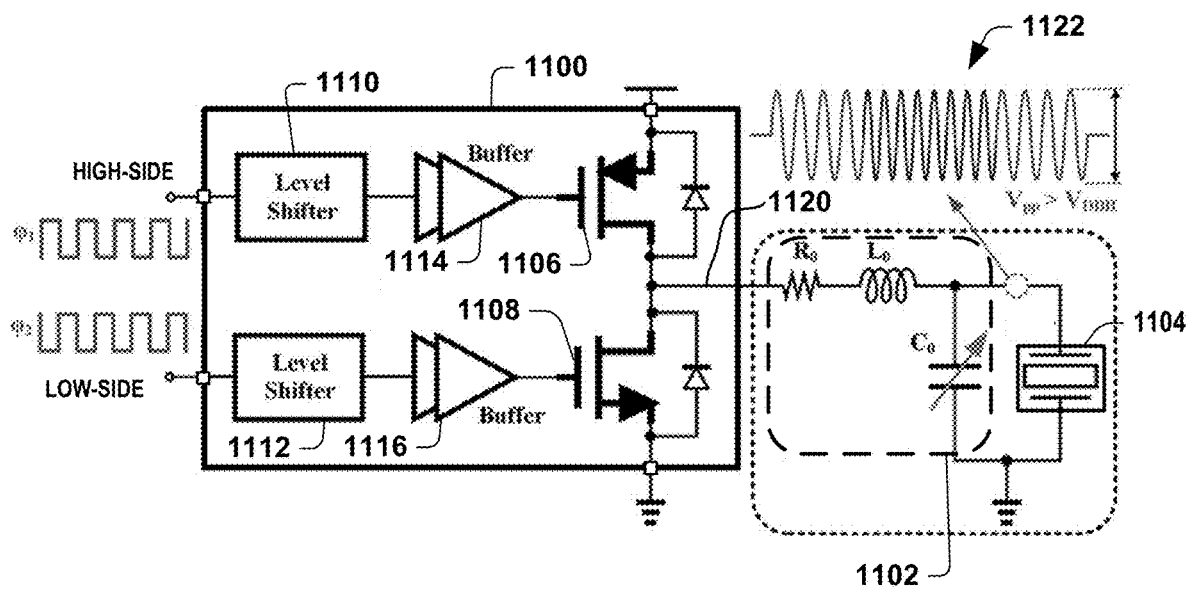
FIG. 11 depicts an example of a power amplifier and filter that may be used to drive transducers of a control node.

FIG. 11 depicts an example of a driver 1100 and filter network 1102 that may be used by a control node (e.g., node 106 or 204) of a wireless sensor network to drive one or more piezoelectric transducers 1104 of the control node. The driver 1100 has inputs coupled to receive control signals $\phi 1$ and $\phi 2$ (e.g., from the FPGA 1000). For example, the signals may be utilized as gate drive signals for implementing pulse-width modulation (PWM) or another form of modulation (e.g., pulse code modulation [PCM]), to control high- and low-side field effect transistors (FETs) 1106 and 1108 of the driver 1100. The signals $\phi 1$ and $\phi 2$ are provided to respective level shifters 1110 and 1112, which provide corresponding level-shifted clock signals to buffers 1114 and 1116, respectively. Each of the buffers 1114 and 1116 has an output coupled to the gate of its associated FET 1106 and 1108 for biasing the FETs (e.g., a half-bridge) according to the timing of the respective clock signals $\phi 1$ and $\phi 2$. An output 1120 of the half-bridge provides a drive signal to the filter network 1102, which results in a filtered drive signal (demonstrated at 1122) for exciting the transducer 1104. For example, the filter may be a programmable low pass filter to implement tuning of the acoustic signal being generated by the transducer 1104, such as by configuring a variable capacitor 1122 of an RLC filter. While the beamforming circuitry of FIGS. 10 and 11 has generally been described in the context of being implemented at the control node, these or similar beamforming techniques are equally applicable to and may be implemented in each of the WSNs to improve efficiency and increase power delivery between nodes.

Figure 12:
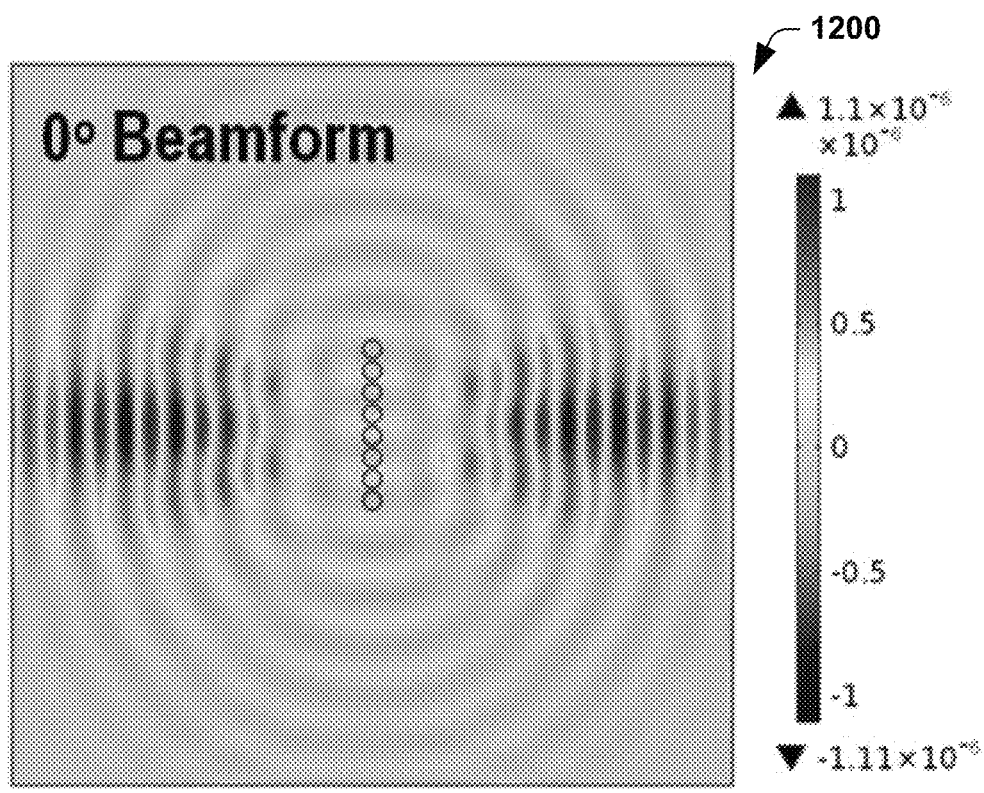
FIGS. 12 and 13 depict examples of beam forming patterns that may be implemented for a linear array of transducers, such as may be implemented in a control node.
Figure 13:
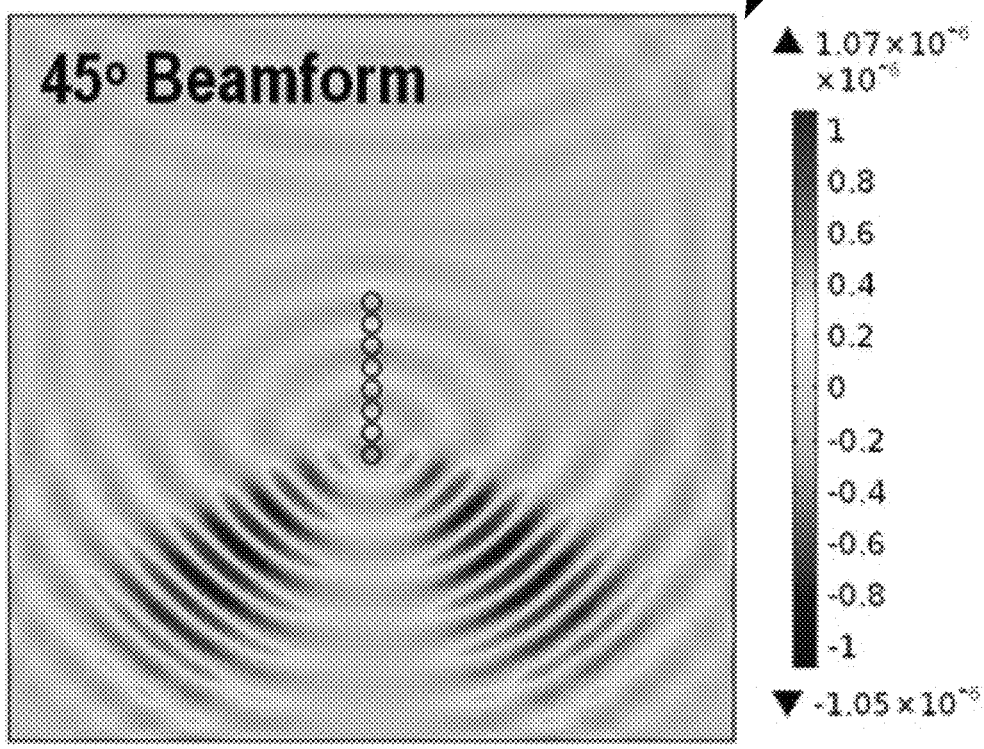

FIGS. 12 and 13 depict examples of beamforming patterns 1200 and 1300 that may be implemented for a linear array of transducers, such as may be implemented in a control node (e.g., by the FPGA 1000 and driver 1100 of FIGS. 10 and 11) of a wireless sensor network. For example, this or other beamforming techniques may improve the available power density at a WSN by a factor of $(2\pi/\alpha)$, where $\alpha$ is the main lobe beam width (at −3 dB). The examples of FIGS. 12 and 14 show beams at angles of both $\theta=0°$ and $45°$ when the transducer array is excited by an array of 5-cycle windowed sinusoid waves (e.g., 1 $V_{pp}$, 100 kHz) subjected to an inter-element delay of d $\cos(\theta)/v(f)$, where $v(f)$ is the wave propagation speed at the excitation frequency.

As a further example, FIGS. 14A and 14B depict example plots 1400 and 1420 of normalized power versus angle for a measured beam pattern, such as may be measured in WSN (e.g., at a WSN 102, 104, 2020, 300) responsive to acoustic signals generated by a control node of a wireless sensor network. FIGS. 14A and 14B show the measured beam pattern (e.g., measured) versus phase shift without apodization (at 1400) and with apodization (at 1420), respectively. As illustrated, side lobes are significantly suppressed by apodization, further demonstrating the effectiveness of the beam steering system disclosed herein. Note that these results were obtained in tone-burst mode, in which each pulse charges a supercapacitor at the receiver.

FIGS. 15A and 15B depict plots 1500 and 1520 of voltage versus current depicting examples of measured power characteristics at different distances in a continuous wave mode. The measured power characteristics shown in FIG. 15A show the measured power at different distances in continuous wave (CW) mode, for a distance of r=25 cm, and a maximum power of Pmax=433.7 µW at an optimum load resistance Ropt=2.46 kΩ. The measured power characteristics shown in FIG. 15B are demonstrated for r=50 cm, Pmax=225.5 µW at Ropt=920Ω. The plot of FIG. 15A shows maximum power delivery occurs at 282 kHz for distance of 25 cm and FIG. 15B shows maximum power delivery occurs at 239 kHz at 50 cm. Notice that standing wave patterns are generated over the structure in CW mode, resulting in rapid fluctuations of the frequency response (even over a 1 kHz span). The frequency response is also modified by environmental factors (e.g., temperature), structural deformations, and other time-varying factors, thus demonstrating the need for adaptive control of the operating frequency.

Figure 16:
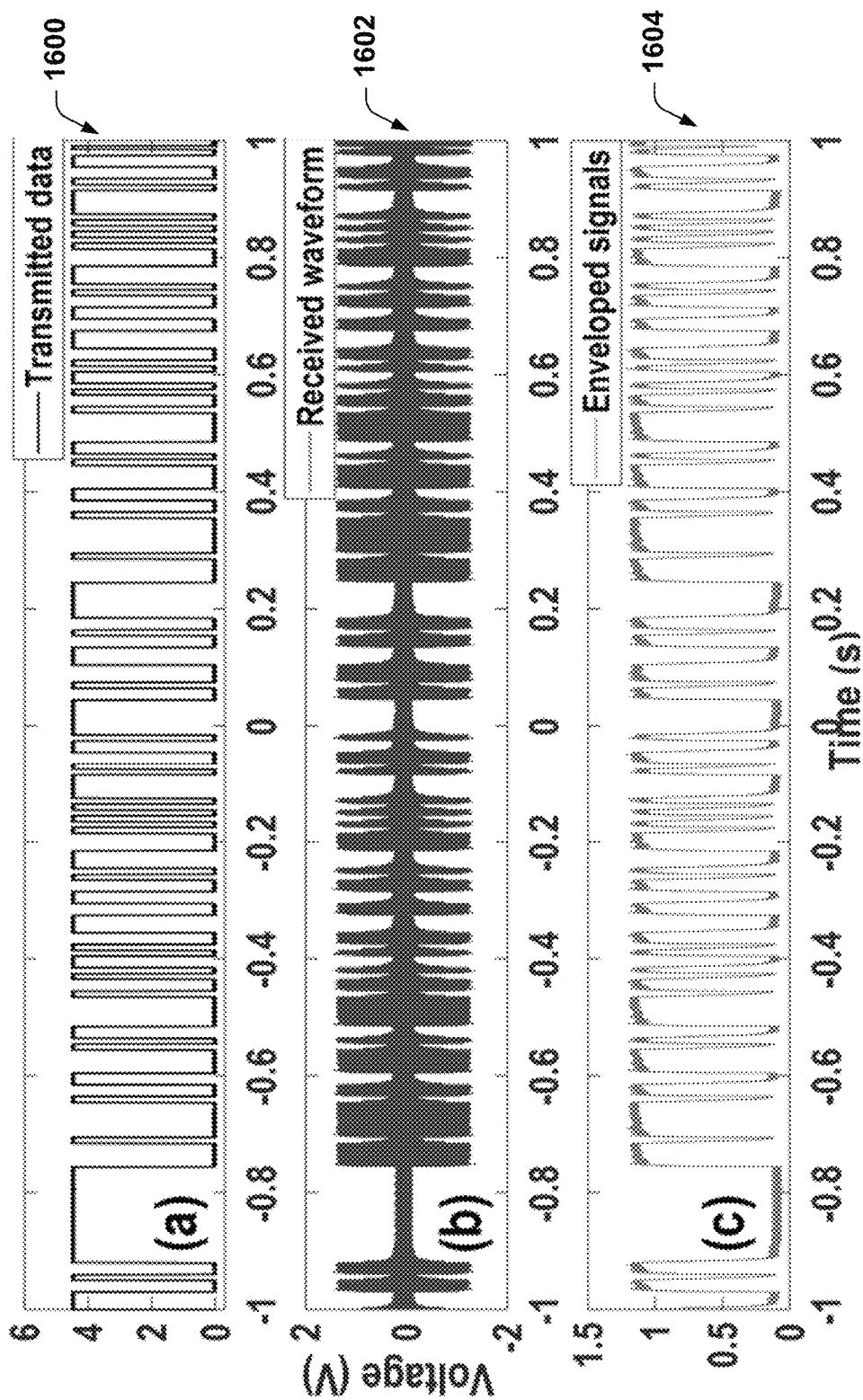
FIG. 16 depicts examples of transmitted, received and demodulated data that is communicated acoustically using binary frequency shift keying modulation in a continuous wave mode.

FIG. 16 depicts examples of transmitted data 1600, received data 1602 and demodulated data 1604 that are communicated acoustically over or through a solid medium (e.g., a metal plate) using binary frequency shift keying (BFSK) modulation in a continuous wave mode. Such standing wave patterns are extremely sensitive to the excitation frequency, while the overall frequency response follows that in tone-burst mode. This allows nearby frequencies to be used for bits '0' and '1' (denoted $f_0$ and $f_1$) while also maximizing power delivery by maintaining optimal load conditions. Plot 1602 shows a typical BFSK-modulated signal at the receiver, where $f_0$=261 kHz, $f_1$=263 kHz, and the data rate is 80 bps. The demodulated data of plot 1604 is the same as the transmitted data of plot 1604, which demonstrates the accuracy of the data transfer scheme. In one example, it was demonstrated that generating $2 \times 10^4$ pseudo-random bits resulted in no demodulated errors up to about 80 bps, which should be reasonable for many sensing applications (e.g., structural health monitoring).

Figure 17:
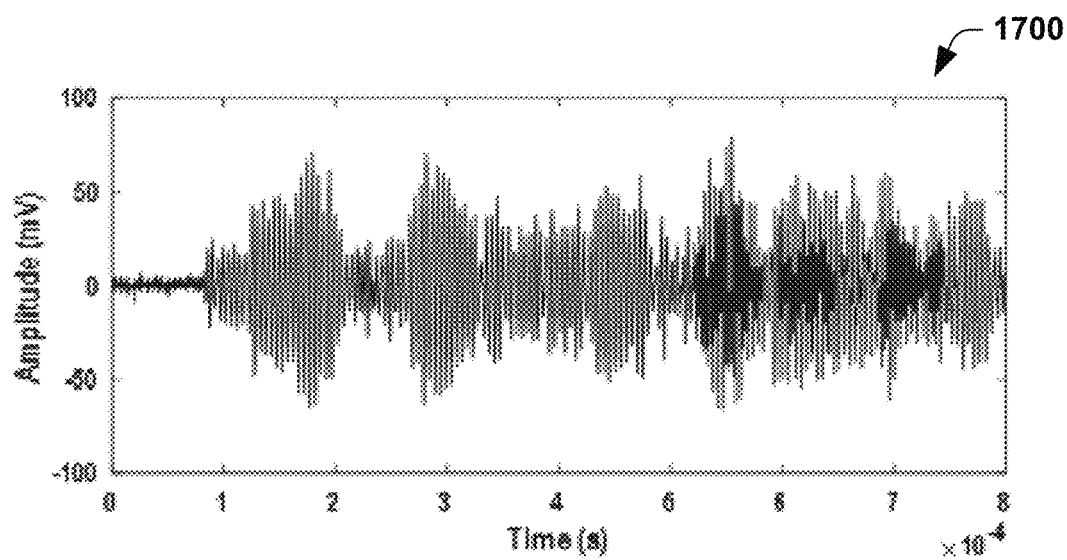
FIG. 17 depicts an example of a recorded waveform at a receiver.
Figure 18:
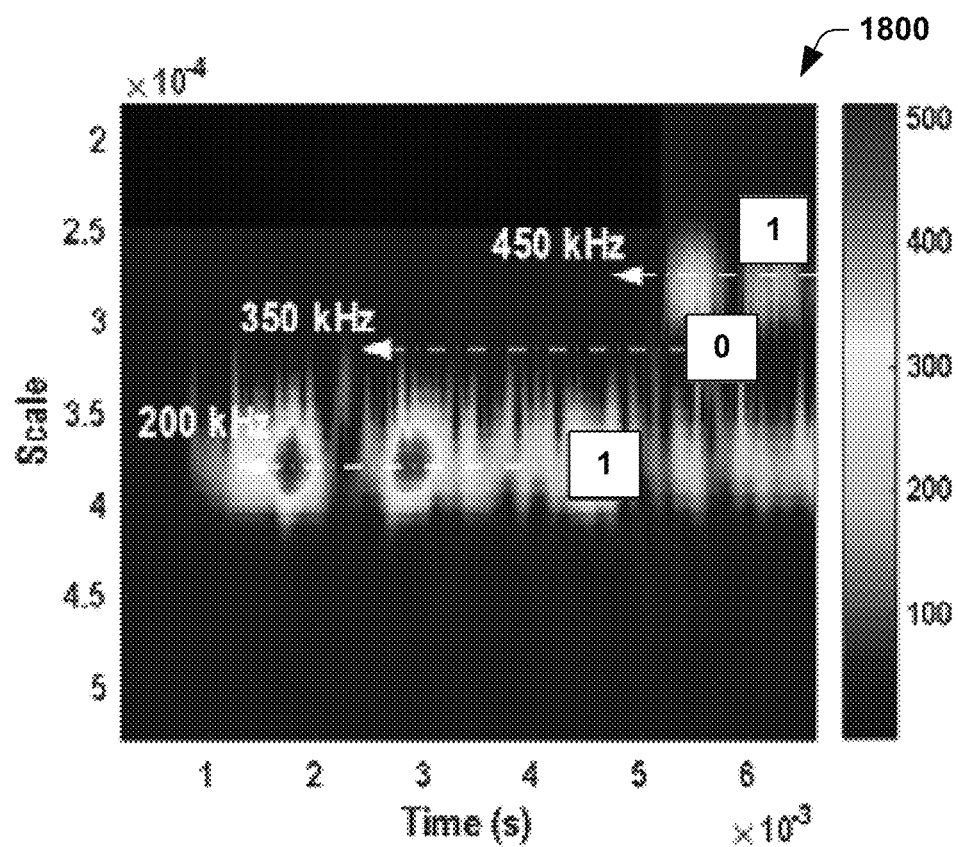
FIG. 18 depicts an example of a decoded acoustic waveform.

FIG. 17 depicts an example of a recorded waveform 1700 measured at a receiver (e.g., a receiver of a WSN (e.g., at a WSN 102, 104, 2020, 300) responsive to acoustic signals generated by another node (e.g., a WSN or control node). In this example, the recorded waveform provides an example of a complex pulse response of an acoustic channel that is encoded with '101' by the transmitter. FIG. 18 depicts an example of a decoded acoustic waveform 1800. For example, the received signal is decoded using a wavelet transform to identify decoded digits '101', which demonstrates a successful decoding of information in the transmitted signal waveform.

The example of FIGS. 17 and 18 show the experimental results of acoustic data transfer based on frequency-shift keying (FSK). The frequency bands were selected to ensure high power gain as well as enough frequency discrimination for successfully decoding information at the receiver end. FIG. 17 shows the complex received waveform in the time domain in which inter-symbol interference dominates due to multiple reflections. Various other methods may be used for communicating over such complex channels, with the modulation protocol selected according to the properties of the medium. For example, link-adaptive orthogonal frequency-division multiplexing (OFDM) may be used for high-data-rate acoustic communications through metal plates or walls. OFDM encodes digital data on multiple closely-spaced orthogonal sub-carriers and is particularly suitable for maximizing throughput for channels with high-frequency attenuation, narrowband interference, and multipath or multimode propagation; moreover, it does not require complex equalization filters.

As mentioned, the systems and methods disclosed herein may implement machine learning. For example, machine learning may be utilized to adaptively configure communications parameters. Additionally or alternatively, machine learning may be utilized for feature extraction and classification. For example, the machine learning methods may be implemented by an MLCP of a WSN and/or control node, such as an ELM-based MLCP IC chip. The machine learning helps to improve robustness to noisy and highly variable conditions (e.g., due to electrical and/or and environmental conditions) that often exist in various sensing applications.

As the wireless sensing system scales to large sizes, one limiting factor is communication bandwidth. The total data throughput of such networks increases at least linearly with the number of nodes and, for systems where inter-node communications are used, the rate of increase can even be quadratic. The MLCP implemented within each node can help mitigate the bandwidth issue and improve overall system accuracy. For example, each MLCP is programmed to implement highly-optimized feature extraction and classification algorithms on the raw time-domain waveforms received from nearby transducers, and its outputs will correspond to very high-level categories, such as "normal"/ "abnormal" or "damage present"/"damage absent". Such classification results can be transmitted to the local control node at much lower data rates than either raw waveforms or low-level waveform features, thus resulting in a highly-scalable network. Moreover, the classification results are used to adapt communication parameters that are used for sensing measurements, including, for example: i) frequency and shape of the transmitted waveform, and ii) gain and frequency response of the receiver. Such closed-loop adaptation of these and other communication parameters, as disclosed herein, improves accuracy, saves power, and increases hardware lifetime.

Figure 19:
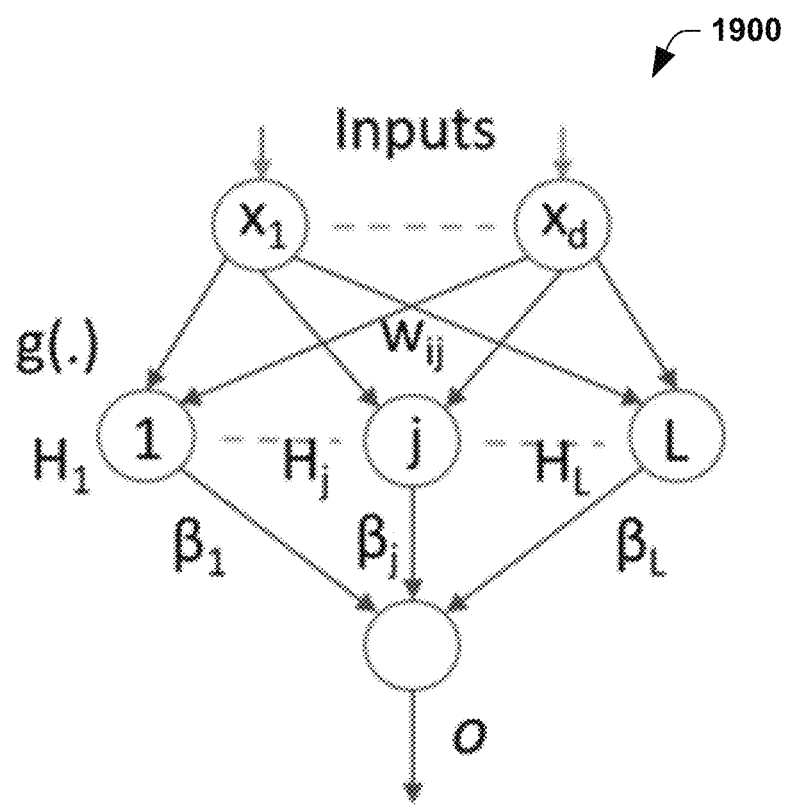
FIG. 19 depicts an example of a basic structure for an extreme learning machine that may be implemented in a wireless sensor node.

FIG. 19 depicts an example of a basic structure for an extreme learning machine (ELM) that may be implemented in a node, such as to perform environmental compensation and learning. For example, the environmental compensation uses hardware-efficient signal processing operations to extract low-level waveform features used for environmental compensation (correlation coefficients, time delays, etc.). For example, single-bit operations are used to efficiently compute polarity coincidence correlation (PCC) functions for estimating time delays. The learning operation of the ELM may use an ML algorithm to hierarchically combine low-level features into higher level features suitable for clustering and classification. The implementation of the ML algorithm may be implemented in the MLCP, such as may be implemented using either analog, digital, or hybrid analog-digital signal processing. In an example, an analog implementation may be utilized for a variety of sensing application due to the lower accuracy that may be sufficient.

As one example, the ELM network 1900 provides a single-hidden-layer feed-forward neural network (SHLN) with state-of-the-art performance for various multi-class regression and classification tasks. As shown in FIG. 19, the k-th output of the ELM network (1≤k≤C) is given by $o_k=\Sigma_{i=1}^{L}\beta_{ki}g(w_i^T x+b_i)$, where x is the input feature vector (transducer waveforms in receive mode), $b_i$ is the bias for each hidden layer node, $w_i$ and $\beta_{ki}$ are the input and output weights, respectively, and g( ) is a non-linear activation function. In classification tasks, x is categorized into the k-th class if $o_k$ is the largest output. In an example, w consists of fixed random numbers from any continuous probability distribution, so only the matrix β needs to be trained. Hence training reduces to finding a least-squares solution of a set of linear equations Hβ=T, where H denotes the hidden layer outputs and T is the training data set. This matrix inversion problem can be solved analytically, so training may be implemented in a single-step and extremely fast, unlike some other training algorithms, such as back-propagation. Thus ELM weights can be quickly updated to account for changing input statistics. Generalization performance is generally superior to other algorithms, such as SVMs. Additionally, ELMs can be readily implemented on low-power hardware, and H can also be reused for multiple operations on x, which results in hardware savings.

FIG. 20 depicts an example of a signal processing and machine learning framework 2000 that may be implemented in a wireless sensor network. The data collected by the receiver hardware is first fed into an environmental/temperature compensation module 2002. The module is configured to adjust the data to be less affected by temperature and other medium-term effects (when compared with a baseline signal). An ELM-based co-processor 2004 is configured to detect damage or an abnormal condition of the medium in the presence of short- and medium-term noise and variations. This ELM 2004 also may "awaken" the localization and network communication hardware when damage is detected at 2006. When damage is not detected, the ELM co-processor adaptively updates its weights, indicated at 2008. In some examples, an adaptive baseline database 2010 is used to store compressed data from the ELM co-processor 2004. The database 2010 may be used to extract variations from different sources (including damage) and address long-term changes in the data. When damage is detected at 2006, localization and network communication hardware 2012 is activated and the measured data from the database 2010 is passed to the on and network communication hardware. As described herein, each node transfers compressed information (e.g., classification results) to the control node, which then aggregates the data and performs localization and employs statistical verification 2014 to determine if the result is statistically significant.

In an example, the environmental compensation 2002 may be implemented by a scale transform algorithm, which is disclosed in Joel B. Harley and José M. F. Moura, 'Scale Transform Signal Processing for Optimal Ultrasonic Temperature Compensation', IEEE Trans. Ultrason., Ferroelectr., Freq. Control, 59.10 (2012), 2226-36, which is incorporated herein. The scale transform algorithm is a computationally efficient (due to its utilization of the fast Fourier transform) implementation of a common stretch-based adjustment approach used in the structural health monitoring community.

The scale transform algorithm is based on the fact that many environmental effects, such as temperature and stress, alter the velocity of wave propagation. After a small velocity change, waves travelling a short distance shift slightly in time while waves travelling a long distance shift much more. This results in a stretch-like effect on the data. This effect can create significant differences between data and baseline measurements. For example, velocity variations on simulated data are illustrated in FIGS. 21A and 21B. FIGS. 21A and 21B show that the differences due to a 1% velocity change are larger in amplitude than the original signals. Therefore, new measurements (potentially with damage) can be expressed as stretched versions of prior baseline (damage-free) measurements. With the scale transform, the new data may be re-stretched to optimally match with the damage-free baseline data (stored at 2010).

As a further example, while the scale transform is relatively computationally efficient (requiring a N log(N) complexity, where N is the number of samples in each signal), it requires interpolating a length N signal to a length N log(N) signal for optimal performance. This can be a challenge for memory requirements. The scale transform process also requires that the forward and inverse Fourier transforms be computed for each signal, which can be prohibitively expensive to perform with limited memory. Therefore, the damage detection algorithms may be configured to perform with high levels of accuracy with signals containing significantly less samples, allowing the ELM 2004 to perform the full scale transform without loss of precision due to lack of storage.

The ELM co-processor 2004 is a neural network for high performance, computational efficient classification. FIG. 22 depicts an example layout for an extreme learning machine neural network 2200, such as may be utilized by the ELM 2004 for monitoring applications (e.g., structural health monitoring). The network 2200 projects data 2202 onto a random subspace 2204. If that subspace 2204 is of a lower dimension, the data is compressed into this space to provide corresponding compressed data. Learned weights 2206 are applied to the updated subspace to provide a resulting classification By way of further example, the ELM 2004 is trained using data both with and without damage present. For example, the possible classifications for the data may be "normal," "damage present," or "abnormal" (or unknown). In another, there is no information about the damage, such that the data may be classified as "normal" or "damage present." When the data is classified as "normal," the weight of the neural network is adaptively updated and the measurement database is also updated. For data classified as normal, the localization and network communications hardware 2012 is not activated. When the data is classified as "damage present" or "abnormal," the localization and network communications subsystem 2012 is activated and data is passed, as described above.

In one example, the detection and localization method (e.g., implemented by the ELM 2004) is configured to use a single baseline measurement. In another example, the detection and localization method is configured to use multiple measurements or baselines in conjugation decomposition techniques (e.g., singular value decomposition or independent component analysis) to remove uncertainties and achieve better damage detection and localization than possible with a single baseline. For example, multiple measurements may be stored in a database to extract from them a representative baseline and damage measurement. The singular value decomposition may be performed on the compressed data from the ELM co-processor 2004 instead of the significantly larger raw data. Using this compressed data in this way can reduce the data size by more than 100 times and speed-up computation by more than 2500 times, while achieving nearly identical results. Additionally, a set of multiple measurement samples with the largest differences from the current database measurements can be selectively stored in memory to further improve memory efficiency. The database will also contain always contain a first set of Q baseline measurements and the most recent Q' measurements, wherein Q and Q' are positive integers denoting the number of measurements being stored. For example Q=Q' (e.g., Q=Q'=10 samples); although Q and Q' could be different in some cases. Such a sampling strategy, known as Chebyshev sampling, limits statistical biases in the results.

While detection of damage or an abnormal condition can be accomplished with a single WSN, at least three nodes are necessary to locate damage. Furthermore, as the number of nodes increases, the localization reliability increases. Therefore, communication between each node is essential to locate damage. In an example, damage may be located by the ELM co-processor 2004 by implementing the delay-and-sum technique. FIGS. 23A and 23B illustrate example detection results 2300 and 2320, respectively, that may be determined by implementing the delay-and-sum algorithm. In FIGS. 23A and 23B, white squares correspond to WSN locations across a surface of a medium. FIG. 23A shows a marked location 2302 and FIG. 23B shows the determined location 2322 using delay-and-sum localization.

In another example, the controller (e.g., of one or more WSNs and/or the control node) is programmed to create images based on the compressed data from the ELM co-processor 2204 instead of from the much larger raw data. Such compressed data can still accurately be used to compute the metrics employed by delay-and-sum localization. To improve communication efficiency within the sensor network, data will be locally preprocessed at each node to minimize the data transmitted. For example, the delay-and-sum localization implemented at each is programmed to transmit only a small subset of available wavelet coefficients (i.e., compressed localization images) per node.

In one example, localization images may be generated with maximum values to indicate the locations of damage. Yet, if the MLCP of a single node errors and there is no damage in the structure, there may still be a maximum value in the image. In an example, the MLCP is programmed to apply statistical verification 2014 to each localization image as a metric to verify that the maximum corresponds to damage and to limit false alarms in the framework 2000. As a further example, the statistical verification 2014 may be programmed to utilize extreme value statistical theory (e.g., delay-and-sum or RADAR based localization methods) to determine if the maximum values in the images (as well as other values) are statistically significant compared with the random and systematic noise in the image.

As a further example, communication protocols utilized by the wireless nodes may be modified to support the proposed acoustically-coupled wireless network architecture. Such communication protocols may employ any of several methods for transmitting and receiving real-time data and low-speed data on the same physical acoustic channels. These transmission methods implemented at each node may include time slotting, priority driven, and modulation based. As an example, for time slotting, a real-time data packet takes ~1 ms to transmit, so a node with pending low-speed data packets can use the period between adjacent real-time packets to transmit its low-speed packets. For priority driven communication, the node is free at any time to forward low-speed data from its "store and forward" buffer or an incoming low-speed data packet from another node it is connected to. However, if the node's receiver detects a real time data packet, the node will abort its transmission of the low-speed data packet and handle the real time data packet. For modulation based communication, the real-time and low speed data could be transmitted simultaneously on the same acoustic channel using different modulation techniques. For example, in frequency-division multiplexing, real-time data can be frequency-modulated to a high-frequency band while low-speed data is modulated to a lower-frequency band.

Additionally, because time delay estimation is a basic operation in the wireless sensor network systems and methods disclosed herein, the clocks of all the wireless sensor nodes are synchronized relative to the local control node. For example, high-resolution sensing algorithms require the set of nodes to remain coherent (phase-locked) during each measurement, i.e., operate at the same frequency with constant (known) relative phase differences between them. In practice, coherence may be limited by clock synchronization errors and localization errors (i.e., uncertainty in node positions). Accordingly, the nodes disclosed herein may implement a simple clock synchronization algorithm for use in the wireless network, such as shown with respect to FIG. 4. As explained with respect to FIG. 4, the local control node periodically sends synchronization packets to the nodes by modulating the power carrier waveform in amplitude or phase. Each demodulated packet contains a synchronization sequence (e.g., a repeating '0101 . . . ' bit pattern) that serves as the reference input for the frequency synthesizer. The repetition rate of the synchronization packets is adjusted such that the on-chip oscillators (e.g., clock generators) remain coherent (phase-locked). However, differences in ultrasonic wave propagation delays between the controller and each wireless node (due to geometry or material properties) still may result in relative phase errors between the synthesized clocks. These static timing errors may be removed during initial calibration of the SHM network by programming an on-chip digital clock delay circuit to implement delays to compensate for such errors.

In view of the foregoing, passive SHM systems (based on recording acoustic emissions, transducer impedances, and other "ambient" variables) have complementary advantages for damage detection compared to the active systems (based on guided wave propagation). Thus, dual-mode or hybrid (active-passive) wireless sensor networks may be implemented by WSNs disclosed herein by having each node's controller being configured to operate the respective node in either active or passive mode under algorithmic control. In passive mode, the transmitter is turned off to save power, and receiver properties are programmed to different values (e.g., higher gain and lower bandwidth) than in active mode. In one simple algorithm, a passive node triggers nearby nodes to switch to active mode when it detects broadband impulse events with large enough amplitude (e.g., bird strikes on aircraft).

Figure 24:
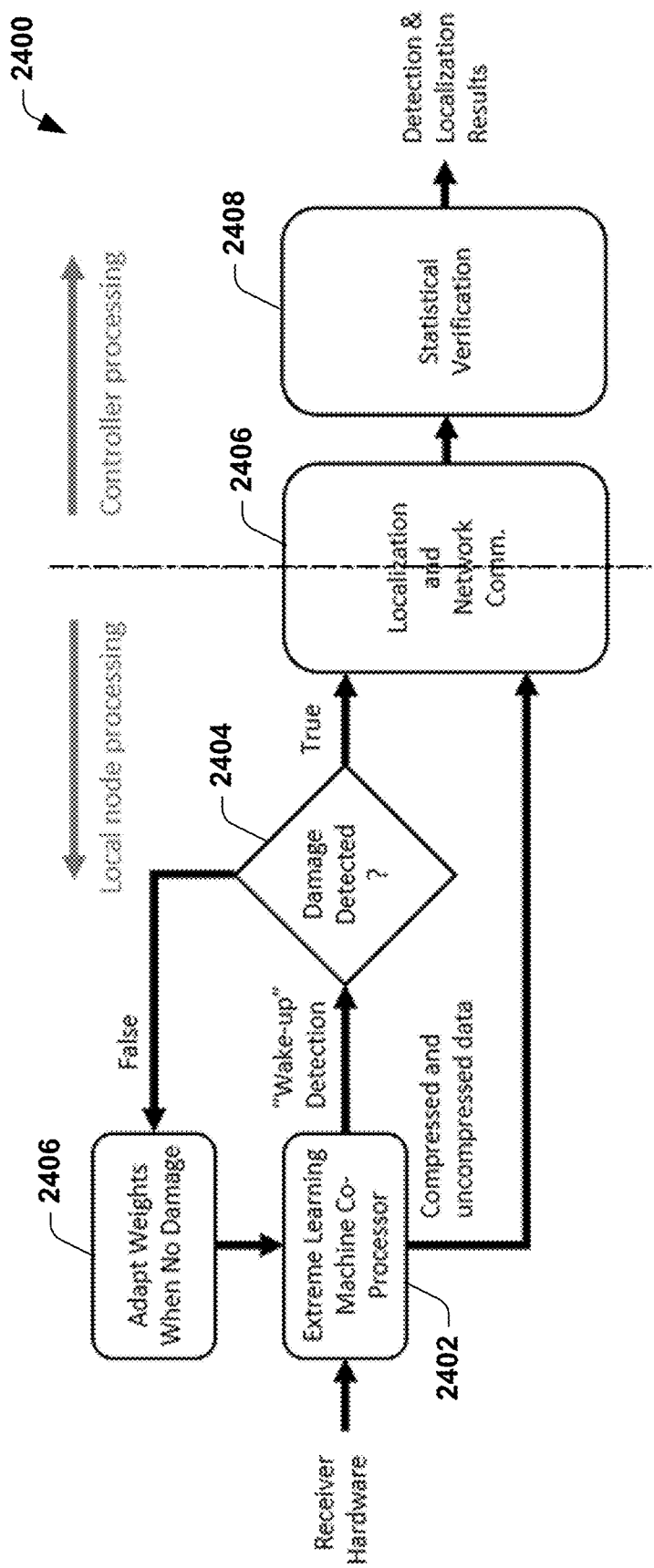
FIG. 24 depicts an example of workflow that can be utilized for signal processing and machine learning for a passive wireless sensing network.

For example, FIG. 24 depicts an example of a passive monitoring algorithm framework 2400, which is algorithmically similar to the active monitoring framework of FIG. 20. For example, the framework 2400 includes an ELM co-processor 2402 to perform feature extraction and classification (e.g., implemented according to extreme learning machine neural network 2200). The ELM co-processor 2402 is configured to detect damage or an abnormal condition of the medium in the presence of short- and medium-term noise and variations. This ELM 2402 also may "awaken" the localization and network communication hardware when damage is detected at 2404. When damage is not detected, the ELM co-processor 2402 adaptively updates its weights, indicated at 2406. When damage is detected at 2404, localization and network communication subsystems 2408 are activated and the compressed and uncompressed data from the ELM 2402 is passed to the localization and network communication subsystems. As described herein, each node transfers compressed information (e.g., classification results) to the control node, which then aggregates the data and performs localization and employs statistical verification 2410 to determine if the result is statistically significant.

The differences between the passive framework 2400 and the active framework 2000 include that the environmental compensation is removed, the extreme learning machines require different weights (e.g., to distinguish an impact from noise rather than distinguish damage from baseline data), and the adaptive baseline database is omitted. The delay-and-sum algorithm can compare measured impact data with a delay-based model for impacts at any location across the plate. Both active and passive wireless monitoring systems may use the same statistical verification. Therefore, the wireless network systems may implement active, passive or hybrid active-passive systems using the architecture frameworks disclosed herein.

Figure 25:
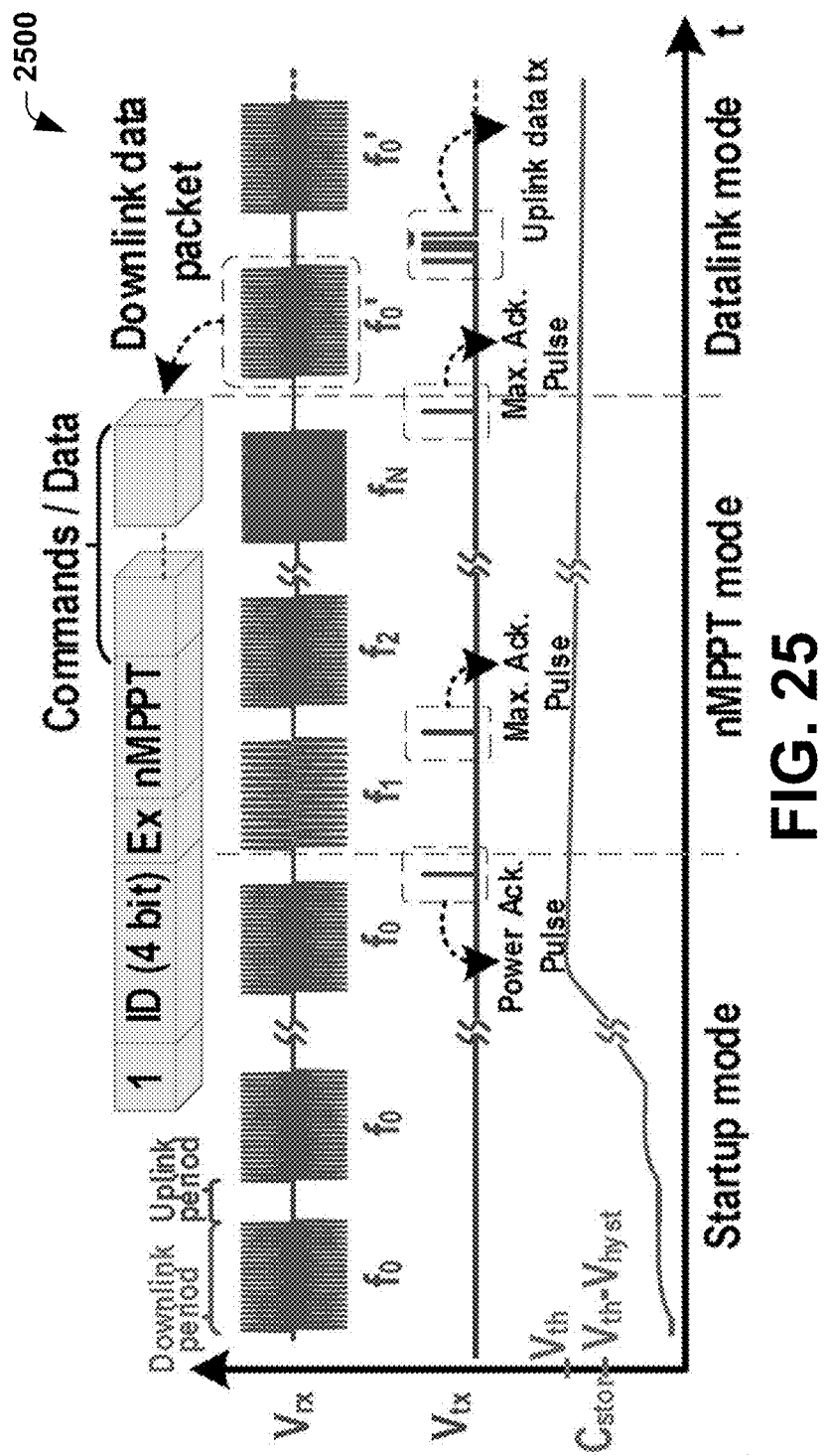
FIG. 25 depicts an example signal protocol that may be implemented in a wireless sensor system.

As a further example, FIG. 25 depicts another example of uplink and downlink signaling protocols 2500 that may be implement in a wireless sensor network (e.g., 100, 200) as disclosed herein. The example of FIG. 25 follows the approach where each node has a unique identity that is specified by an identifier (ID). The approach includes three modes including startup, a near maximum power point tracking (nMPPT) mode and a data link mode. FIG. 25 shows the packetization of data for the downlink communication. A start bit (e.g., of '1') is used to alert the node to the incoming data stream. This is followed by the node's unique ID. While beamforming allows the system to selectively power up a node, it is possible for nodes in the vicinity to get powered up at the same time, so it is more robust to transmit the ID during both uplink and downlink. The 'Exit' (Ex) bit acts as an acknowledgement to end the data link mode and enter startup mode and vice versa. The nMPPT bit, if '1', prompts the node to start the nMPPT routine. The communication cycle follows a similar protocol for any data modulation and/or compression scheme. For example, binary frequency shift keying (BFSK) or another modulation protocol is used to encode the downlink data. Due to the frequency-selective channel, the received waveform is amplitude modulated and thus reconstructed, such as using an amplitude shift keying (ASK) demodulator at the sensor node. For higher data rates, on-off keying (OOK) or orthogonal frequency division multiplexing (OFDM) can be used.

For data uplink, two considerations are i) the unknown channel characteristics (the forward and reverse channel transfer functions are not expected to be same), and ii) the sensor node's limited power budget. The data encoding method may be optimized for the uplink. For example, NRZ or NRZ-I encoding is suitable for this type of channel since it keeps the number of transitions to a minimum. A return-to-zero (RZ) scheme like pulse width modulation (PWM) can also be used. However, this results in a larger number of transitions per bit, which increases power consumption for a given data rate.

Figure 26:
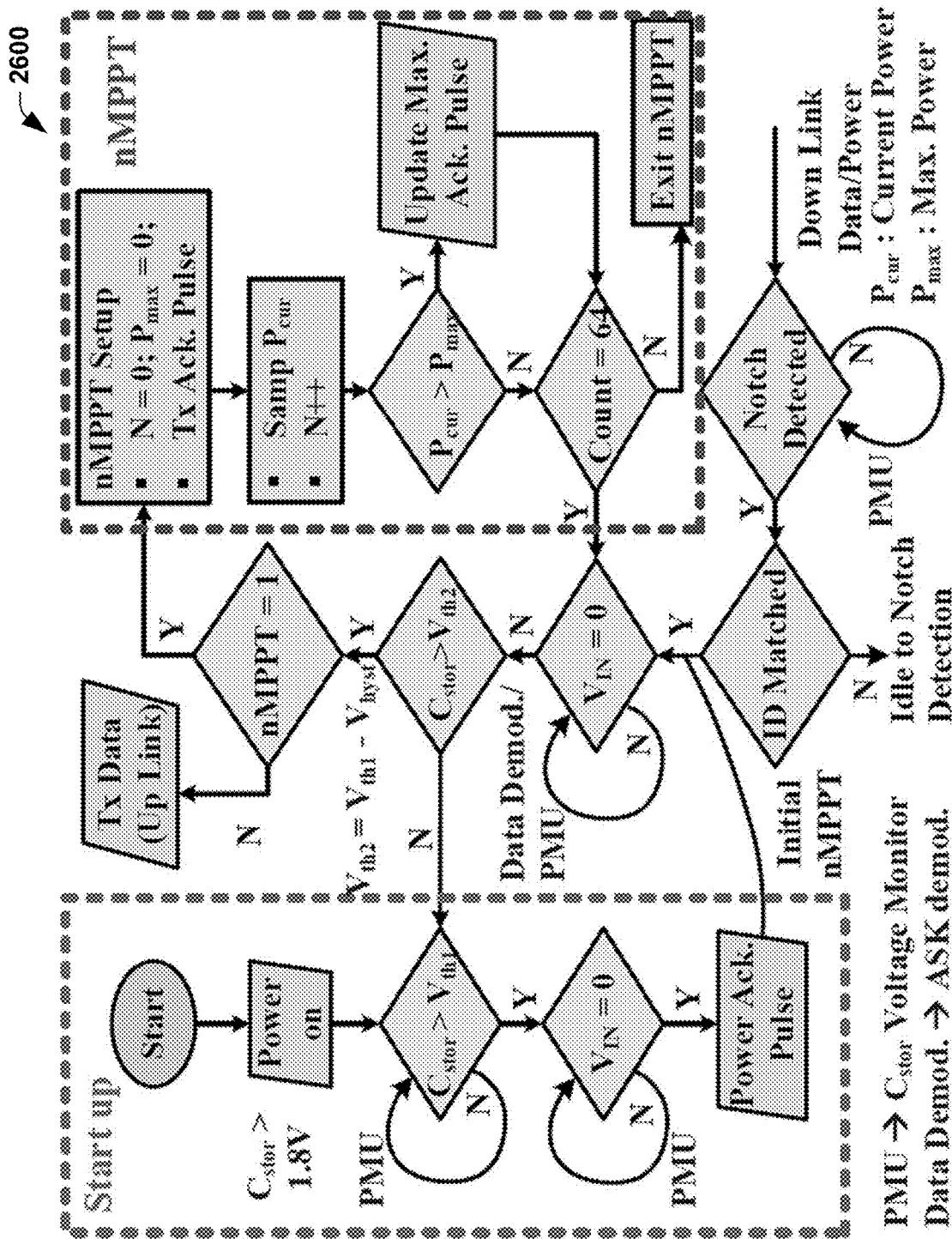
FIG. 26 is a flow diagram depicting an example algorithm that may be used for performing link optimization in a wireless sensor system

FIG. 26 depicts a simplified example of a proposed link optimization algorithm 2600 that may be implemented in a wireless sensor system (e.g., system 100, 200). The overall goal is to keep the central hub and the node in sync with each other. This is used because i) several of the link parameters are to be adaptively set to help ensure nMPPT and low BER, and ii) the nodes are otherwise inaccessible. For example, where all the commands are sent from the control node, the control node is configured to retain primary control over the communication link. For example, the control node can be programmed to perform nMPPT sweeps over any set of frequencies, with higher resolution or over a wider frequency range, without the need to reconfigure the sensor nodes.

Figure 27:
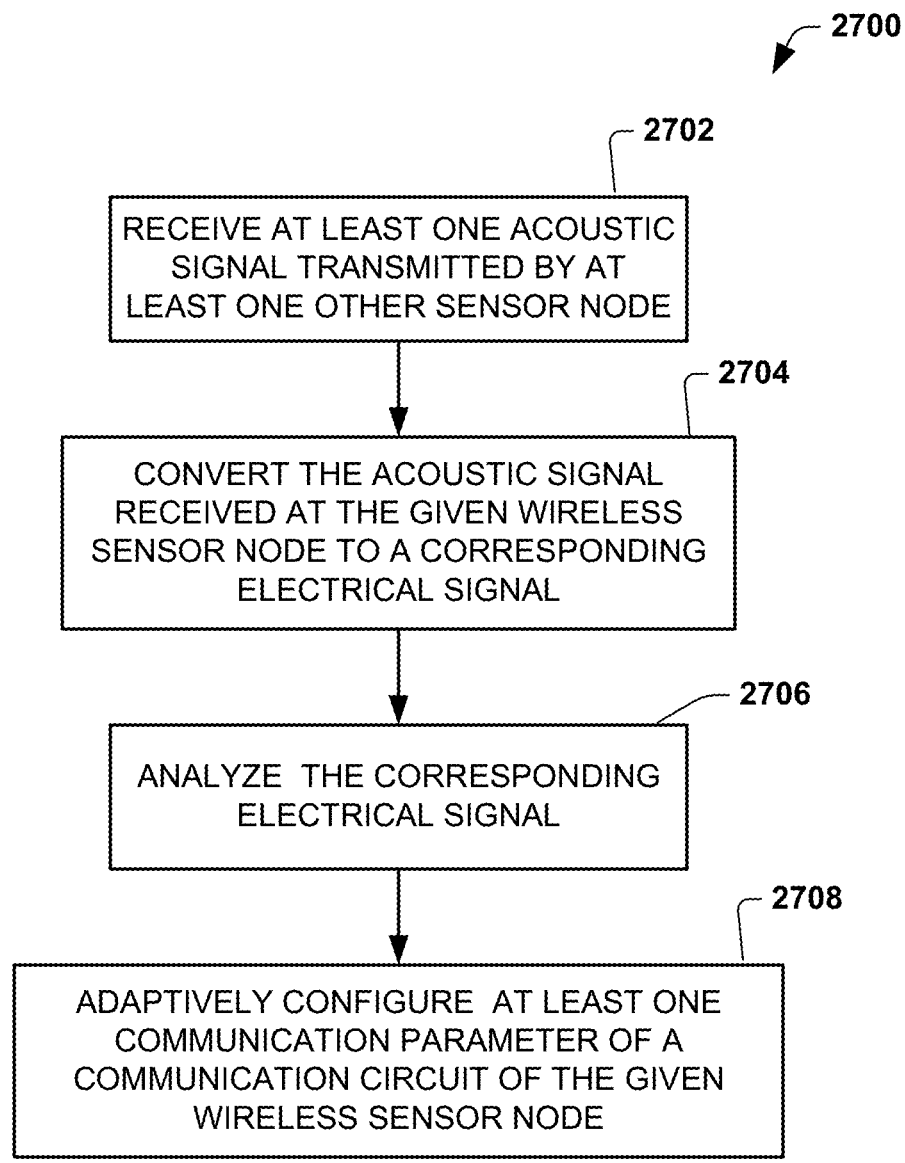
FIG. 27 is a flow diagram depicting a method for adaptively configuring a node in a wireless sensor system.

In view of the foregoing structural and functional features described above, methods that can be implemented will be better appreciated with reference to FIG. 27. While, for purposes of simplicity of explanation, the method 2700 of FIG. 27 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method. The methods or portions thereof can be implemented as instructions stored in one or more non-transitory storage media as well as be executed by a processor of a computer device or special purpose computer device (e.g., a dedicated computing appliance) to access data sources and perform the functions disclosed herein, for example.

As shown in FIG. 27, at 2702, the method 2700 includes receiving, at a given wireless sensor node (e.g., node 102, 104, 202, 300), at least one acoustic signal transmitted by at least one other wireless sensor node via a medium. Each of the wireless sensor nodes may be disposed on or in the medium and be acoustically coupled via the medium to form a wireless sensor network (e.g., 100, 200). At 2704, at least one acoustic signal received at the given wireless sensor node is converted to a corresponding received electrical signal. At 2706, the corresponding received electrical signal is analyzed by a controller (e.g., 114, 124,604, 1002, 2000, 2400) of the given wireless sensor node. At 2708, the method 2700 includes adaptively configuring at least one communication parameter of a communication circuit (e.g., 112, 122, 142) of the given wireless sensor node based on analyzing the received electrical signal such that the communication circuit of at least one wireless node transmits and/or receives acoustic signals according to the adjusted communication parameter(s).

In some examples, the method 2700 of FIG. 27 may also include harvesting electrical energy (e.g., by power circuitry 110, 120, 306) at each of the wireless sensor nodes based on acoustic signals received at each respective wireless sensor node such that each of the wireless sensor nodes is self-powered. Additionally or alternatively, the method may include extracting features, by a processor of the given wireless sensor node based on the corresponding received electrical signal, corresponding to at least one acoustic signal received from the at least one other wireless sensor node. The method 2700 may further include classifying, by the processor of the given wireless sensor node (e.g., 114, 120, 142, 604, 2004, 2200, 2402), the extracted features associated with a portion of the medium through which the received acoustic signals propagate to determine classification results. The classification results may be encoded and sent in an acoustic signal transmitted by the given wireless sensor node through the wireless sensor network to a control node thereof.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system, comprising:
a plurality of acoustically coupled nodes, each of the nodes comprising:
a transducer adapted to be coupled to a medium;
a communication circuit coupled to the transducer to send and receive acoustic signals via the medium according to at least one communication parameter; and
a controller to adaptively configure the at least one communication parameter of the communication circuit based on an acoustic signal received from at least one other of the nodes.

2. The system of claim 1, wherein the controller is further to configure the at least one communication parameter based on analyzing a frequency response determined for the acoustic signal received from the at least one other node.

3. The system of claim 1, wherein the network includes a subnetwork of nodes, each of the nodes in the subnetwork having a communication link to at least some of the other nodes in the subnetwork, the controller of each of the nodes in the subnetwork adaptively configuring at least one transmit parameter for each communication link to the other nodes in the subnetwork.

4. The system of claim 1, wherein at least one communication parameter is a transmit parameter that includes at least one of frequency, data rate, modulation protocol and transmit power level.

5. The system of claim 1, wherein one of the nodes is a control node that is adapted to be coupled directly to a source of electrical power and the other of the plurality of nodes are sensor nodes, and at least a set of the sensor nodes in the network are configured to communicate directly acoustically with the control node.

6. The system of claim 5, wherein each of the sensor nodes further comprises a power converter, which is coupled to the receiver, to convert received acoustic signals from the control node into electrical energy and to store the electrical energy in an energy storage device that is coupled to the power converter such that each of the sensor nodes is self-powered.

7. The system of claim 5, wherein each of the sensor nodes is configured to extract features based on received acoustic signals received from other of the sensor nodes and to determine classification results for classifying the extracted features associated with a portion of the medium through which the received acoustic signals propagate, the classification results being sent from the respective wireless sensor nodes to the control node.

8. The system of claim 7, wherein responsive to classifying a spatial region of the medium as containing an abnormality, the controller of at least three of the sensor nodes is configured to activate a localization subsystem, which utilizes communication of acoustic signals between nodes in the set of other nodes, to determine localization information describing a location of the abnormality with respect to the medium, the localization information being communicated from the other nodes to the control node.

9. The system of claim 5,
wherein for each of the of the sensor nodes, the transducer is a first transducer, the communication circuit is first communication circuit, the controller configured to utilize the first transducer and the first communication circuit to perform sensing functions based on acoustic signals communicated between respective sensor nodes, each sensor node further comprising:
a second transducer adapted to be communicatively coupled to the medium; and
a second communication circuit coupled to the second transducer to send and/or receive acoustic signals via the medium,
wherein the controller is further configured to utilize the second transducer and the second communication circuit to perform energy harvesting.

10. The system of claim 1, wherein the controller of a given one of the nodes is further to detect a physical condition of the medium based on acoustic signals received from at least one other of the nodes.

11. The system of claim 1, wherein the controller of a given one of the nodes is programmed to extract features of the medium based on acoustic signals received from a set of multiple other nodes.

12. The system of claim 11, wherein the controller of the given node is further configured to compress data representing the extracted features and to control the transmitter to transmit the compressed data to at least one other node encoded in an acoustic signal through the medium.

13. The system of claim 12, wherein the controller is further programmed to configure the at least one transmit parameter based on the compressed data.

14. The system of claim 12, wherein one of the nodes is a control node and the other of the plurality of nodes are sensor nodes, which form a wireless sensor network, the sensor nodes in the network are configured to communicate acoustically with the control node, directly or indirectly through the network, wherein the control node is configured to generate a feature map based on the compressed data received from the plurality of the nodes.

15. The system of claim 1, wherein the controller is further programmed to configure the at least one communication parameter based on a classification of features extracted from the acoustic signals received from at least one other node,
wherein the at least one communication parameter that is adapted includes at least one of frequency of a transmitted acoustic signal, the shape of the transmitted acoustic signal, a gain of the receiver, and a frequency response of the receiver.

16. A wireless sensing system comprising:
a plurality of acoustically coupled wireless sensor nodes, each of the nodes comprising:
a piezoelectric transducer adapted to be coupled to a medium;
a communication circuit coupled to the transducer to send and receive acoustic signals via the medium according to at least one communication parameter; and
a controller to adaptively configure the at least one communication parameter of the communication circuit based on acoustic signals received from at least one other of the nodes; and
a control node that is adapted to be coupled directly to a source of electrical power and the other of the plurality of nodes are sensor nodes, nodes in at least a set of the sensor nodes in the network are configured to communicate directly acoustically with the control node.

17. The system of claim 16, wherein each of the wireless sensor nodes further comprises a power circuit, which is coupled to transducer, to harvest electrical energy responsive to received acoustic signals from the control node and to store the electrical energy in an energy storage device that is coupled to the power circuit such that each of the sensor nodes is self-powered.

18. The system of claim 16, wherein each of the wireless sensor nodes is configured to extract features based on received acoustic signals received from other of the sensor nodes and to determine classification results for classifying the extracted features associated with a portion of the medium through which the received acoustic signals propagate, the classification results being sent from the wireless sensor nodes to the control node.

19. The system of claim 18, wherein responsive to classifying a spatial region of the medium as containing an abnormality, the controllers of at least three of the sensor nodes are configured to activate a localization subsystem, which utilizes communication of acoustic signals between the at least three sensor nodes, to determine localization information describing a location of the abnormality with respect to the medium, the localization information being communicated from the at least three sensor nodes to the control node.

20. The system of claim 16,
wherein for each of the of the sensor nodes, the transducer is a first transducer, the communication circuit is first communication circuit, the controller configured to utilize the first transducer and the first communication circuit to perform sensing functions based on acoustic signals communicated between respective sensor nodes, each sensor node further comprising:
a second transducer adapted to be coupled to the medium; and
a second communication circuit coupled to the second transducer to send and/or receive acoustic signals via the medium,
wherein the controller is further configured to utilize the second transducer and the second communication circuit to perform energy harvesting.

21. A method comprising:
receiving, at a given wireless sensor node, at least one acoustic signal transmitted by at least one other wireless sensor node via a medium, each of the wireless sensor nodes being disposed on or in the medium and being acoustically coupled via the medium to form a wireless sensor network;
converting, at the given wireless sensor node, the received at least one acoustic signal to a corresponding received electrical signal;
analyzing the corresponding received electrical signal by a controller of the given wireless sensor node; and
adaptively configuring at least one communication parameter of a communication circuit of the given wireless sensor node based on the analyzing of the received electrical signal such that the communication circuit of the given wireless node at least one transmits or receives acoustic signal according to the at least one communication parameter.

22. The method of claim 21, further comprising harvesting electrical energy at each of the wireless sensor nodes based on acoustic signals received at each respective wireless sensor node such that each of the wireless sensor nodes is self-powered.

23. The method of claim 21, further comprising
extracting features, by a processor of the given wireless sensor node, based on the corresponding received electrical signal, corresponding to at least one acoustic signal received from the at least one other wireless sensor node;
classifying, by the processor of the given wireless sensor node, the extracted features associated with a portion of the medium through which the received acoustic signals propagate to determine classification results; and
sending the classification results encoded in an acoustic signal transmitted by the given wireless sensor node through the wireless sensor network to a control node thereof.

\* \* \* \* \*